(12) United States Patent
Yazawa et al.

(10) Patent No.: US 10,876,781 B2
(45) Date of Patent: Dec. 29, 2020

(54) SWITCH MECHANISM, GEARED MOTOR AND DAMPER DEVICE

(71) Applicant: NIDEC SANKYO CORPORATION, Nagano (JP)

(72) Inventors: Takehiko Yazawa, Nagano (JP); Satoru Yokoe, Nagano (JP); Akihiro Ito, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 380 days.

(21) Appl. No.: 15/846,953

(22) Filed: Dec. 19, 2017

(65) Prior Publication Data

US 2018/0340724 A1 Nov. 29, 2018

(30) Foreign Application Priority Data

May 26, 2017 (JP) .................. 2017-104121

(51) Int. Cl.
| | | |
|---|---|---|
| *F25D 17/04* | (2006.01) | |
| *F16H 37/12* | (2006.01) | |
| *F24F 13/10* | (2006.01) | |
| *F24F 13/14* | (2006.01) | |

(52) U.S. Cl.
CPC ............ *F25D 17/045* (2013.01); *F16H 37/12* (2013.01); *F24F 13/10* (2013.01); *F24F 2013/146* (2013.01); *F24F 2013/1446* (2013.01)

(58) Field of Classification Search
CPC .. F16H 37/12; F16H 25/2015; F24F 13/1426; F24F 13/10; F24F 2013/1446; F24F 2013/146; F24F 2140/40; F01L 1/18; F16K 1/2071; B60H 1/00835; B60H 1/00664; B60H 1/00864; H01H 71/46

USPC ......................................... 454/333
See application file for complete search history.

(56) References Cited

U.S. PATENT DOCUMENTS

| | | | | |
|---|---|---|---|---|
| 6,498,310 | B1* | 12/2002 | Bugryn | H01H 71/465 |
| | | | | 200/303 |
| 2006/0163049 | A1* | 7/2006 | Puhalla | H01H 71/465 |
| | | | | 200/330 |
| 2008/0048512 | A1* | 2/2008 | Ito | H02K 5/225 |
| | | | | 310/71 |
| 2008/0257086 | A1* | 10/2008 | Noritake | H02K 7/06 |
| | | | | 74/422 |

FOREIGN PATENT DOCUMENTS

JP 2015068573 A 4/2015

* cited by examiner

*Primary Examiner* — Steven B McAllister
*Assistant Examiner* — Charles R Brawner
(74) *Attorney, Agent, or Firm* — Cantor Colburn LLP

(57) ABSTRACT

A switch mechanism may include a lever holding part which is provided in a case, a turnable lever provided with a shaft part turnably supported by the lever holding part and a first arm part and a second arm part protruded from the shaft part, an urging member structured to urge the turnable lever, and a switch whose state is switched by displacement of the turnable lever. The turnable lever is attached to the lever holding part in a state that the urging member is engaged between the first arm part and the second arm part, and the urging member is movable between an engaging position, where the urging member is engaged between the first arm part and the second arm part, and an engaging release position, where the urging member is engaged with the second arm part and is disengaged from the first arm part.

28 Claims, 15 Drawing Sheets

SWITCH MECHANISM, GEARED MOTOR AND DAMPER DEVICE

CROSS REFERENCE TO RELATED APPLICATION

The present application claims priority under 35 U.S.C. § 119 to Japanese Application No. 2017-104121 filed May 26, 2017, the entire content of which is incorporated herein by reference.

FIELD OF THE INVENTION

At least an embodiment of the present invention may relate to a switch mechanism including an urging member which urges a lever for pushing a switch, and a geared motor and a damper device.

BACKGROUND

Conventionally, a switch mechanism incorporating a lever for turning on and off a switch and an urging member which urges the lever has been used. A hinge device including this type of switch mechanism is disclosed in Japanese Patent Laid-Open No. 2015-68573. The hinge device described in the Patent Literature includes a motor and a gear train structured to transmit rotation of the motor to a link mechanism, and a lever (position lever) is driven by a cam face provided in a gear structuring the gear train. The lever is urged toward a switch (position switch) by a spring which is held by a spring holding part of a case.

In a case that the lever for turning on and off the switch and an urging member such as a spring for urging the lever are to be assembled, conventionally, assembling is performed in a state that the urging member is pressed and thus workability in assembling is not satisfactory. Further, when the lever is not appropriately held, the lever may be abutted with the switch by an urging force of the urging member and thus the switch may be damaged in assembling.

SUMMARY

In view of the problem described above, at least an embodiment of the present invention may advantageously provide a switch mechanism, a geared motor and a damper device in which workability is improved and damage of the switch is prevented when the lever and the urging member are to be assembled into a case.

According to at least an embodiment of the present invention, there may be provided a switch mechanism including a lever holding part which is provided in a case, a turnable lever provided with a shaft part turnably supported by the lever holding part and a first arm part and a second arm part which are protruded from the shaft part, an urging member which urges the turnable lever, and a switch whose state is switched by displacement of the turnable lever. The turnable lever is attached to the lever holding part in a state that the urging member is engaged between the first arm part and the second arm part, and the urging member is movable between an engaging position, where the urging member is engaged between the first arm part and the second arm part, and an engaging release position, where the urging member is engaged with the second arm part and is disengaged from the first arm part.

In at least an embodiment of the present invention, an urging member is engaged between a first arm part and a second arm part of a turnable lever and, in this state, the turnable lever is attached to a case (lever holding part). Further, after the turnable lever is attached, the urging member is moved to an engaging release position and the urging member is arranged between the case and the turnable lever so that the turnable lever is urged. Therefore, when the switch mechanism is to be assembled, the urging member and the turnable lever are not required to be pressed and held against the urging force. Further, the turnable lever and the urging member are restrained from contacting with components (for example, a switch) disposed inside the cover by the urging force. Therefore, workability in assembling is satisfactory and the switch mechanism can be easily assembled. Further, damage of the component in assembling may be restrained.

In at least an embodiment of the present invention, the first arm part is provided with a first engagement part with which an one side end part of the urging member is engaged, the second arm part is provided with a second engagement part with which the other side end part of the urging member is engaged. Further, the second engagement part includes a first engagement region where the other side end part of the urging member located at the engaging position is engaged, and a second engagement region where the other side end part of the urging member located at the engaging release position is engaged. According to this structure, the urging member can be engaged between the first arm part and the second arm part. Further, when the one side end part of the urging member is disengaged from the first engagement part, the urging member can be disposed between the case and the turnable lever.

In this case, it is desirable that the second engagement part is provided with a restriction part which restricts a return of the other side end part from the second engagement region to the first engagement region. According to this structure, when an unexpected force is applied to the urging member after assembling is performed, the urging member is restricted from being returned to the first engagement region. Therefore, the urging member can be held at the engaging release position.

In at least an embodiment of the present invention, the urging member is a torsion coil spring provided with a coil part through which the shaft part is passed, and the one side end part and the other side end part are protruded to different directions from the coil part. According to this structure, the one side end part and the other side end part of the urging member (torsion coil spring) can be engaged between the first arm part and the second arm part.

In at least an embodiment of the present invention, the shaft part is provided with a coil holding part which slidably holds the coil part in an axial line direction, and the coil part slides to one side in the axial line direction when the torsion coil spring is moved to the engaging release position from the engaging position. According to this structure, after assembling is performed, when the coil part is depressed to one side in an axial line direction and is moved to the engaging release position, the torsion coil spring is disposed between the case and the turnable lever to urge the turnable lever.

In at least an embodiment of the present invention, the shaft part is provided with an arm connected part with which the first arm part and the second arm part are connected, the coil holding part is formed on the one side in the axial line direction of the arm connected part, and outer peripheral faces of the arm connected part and the coil holding part are formed with cut-out parts extended in the axial line direction. According to this structure, when a jig is inserted into the cut-out part and the coil part is pressed by the jig, the coil part is moved to the engaging release position. Therefore, work for moving the torsion coil spring to the engaging release position is easily performed.

In at least an embodiment of the present invention, the case is provided with a recessed part which accommodates the coil part of the torsion coil spring having been moved to the engaging release position. According to this structure, the torsion coil spring is disposed between the case and the turnable lever by pushing the coil part to the recessed part and thereby the turnable lever can be urged.

In at least an embodiment of the present invention, the recessed part is provided between the lever holding part and a cylindrical tube part provided on an outer peripheral side with respect to the lever holding part, and the one side end part is passed through a cut-out part formed in the cylindrical tube part and is supported by a spring support wall formed on an outer peripheral side of the cylindrical tube part. According to this structure, when the torsion coil spring is disposed so that the coil part is pushed to the recessed part and the one side end part is inserted into the cut-out part and the one side end part is supported by the spring support wall, the turnable lever is urged.

In at least an embodiment of the present invention, the switch is a pressing type switch. According to this structure, the switch can be switched on and off by the turnable lever.

Next, a geared motor in accordance with at least an embodiment of the present invention includes the above-mentioned switch mechanism, a rotation transmission mechanism including a cam gear on which a cam face capable of abutting with the first arm part is formed, and a motor structured to drive the rotation transmission mechanism. In the geared motor, workability in assembling of the switch mechanism is satisfactory and damage of other components in assembling may be restrained.

In at least an embodiment of the present invention, the rotation transmission mechanism includes a driven wheel which is formed with an output shaft and a drive wheel structured to turn the driven wheel, and the drive wheel is the cam gear. According to this structure, the switch mechanism can be driven by using a gear in a former stage with respect to the gear provided with an output shaft.

In at least an embodiment of the present invention, the rotation transmission mechanism and the motor are accommodated in the case. According to this structure, the switch mechanism can be assembled into the case of the geared motor.

In at least an embodiment of the present invention, the case is formed with a protruded part for holding a lead wire between the switch mechanism and the motor. According to this structure, the lead wire can be held so as not to float up on an inner side of the case. Therefore, the lead wire is restrained from being caught by other components and from being contacted and damaged by an edge. Further, it is desirable that a portion of a lead wire which is connected with the switch and is passed between a turnable range of the turnable lever and the case is held by the protruded part. According to this structure, the lead wire does not float up between the turnable lever and the case. Therefore, the lead wire can be held so as not to contact with the turnable lever.

In at least an embodiment of the present invention, a lead wire which connects the motor with the switch is passed through a space between a bottom part of the case and the motor. According to this structure, the lead wire can be prevented from being floated up by the motor. Further, the lead wire is not passed over the motor and thus, when a case is covered with another case, the lead wire is prevented from being caught between the cases. Further, contacting of the lead wire with an edge of the motor may be restrained and thus disconnection of the lead wire is restrained. Further, the lead wire is extended and disposed by utilizing a space between the case and the motor and thus space-saving can be attained.

Next, a damper device in accordance with at least an embodiment of the present invention includes the above-mentioned geared motor, a baffle which is turned by the geared motor, and a frame provided with an opening part which is opened and closed by the baffle, and the frame is fixed to the case. According to this structure, a turning position of the baffle is detected by the switch mechanism and thereby the geared motor can be controlled. Further, a case is attached to the frame formed with an opening part and a mechanism for driving the baffle can be assembled to an inner side of the case.

In at least an embodiment of the present invention, a wiring outlet is formed between the case and the frame. According to this structure, a wiring outlet can be structured by assembling the case and the frame.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

A geared motor including a switch mechanism and a damper device for a refrigerator to which at least an embodiment of the present invention is applied will be described below with reference to the accompanying drawings. A damper device in accordance with at least an embodiment of the present invention is not limited to a device for a refrigerator and may be used in various devices in which an intake port for a fluid is opened and closed to adjust a flow amount.

(Entire Structure)

Figure 1:
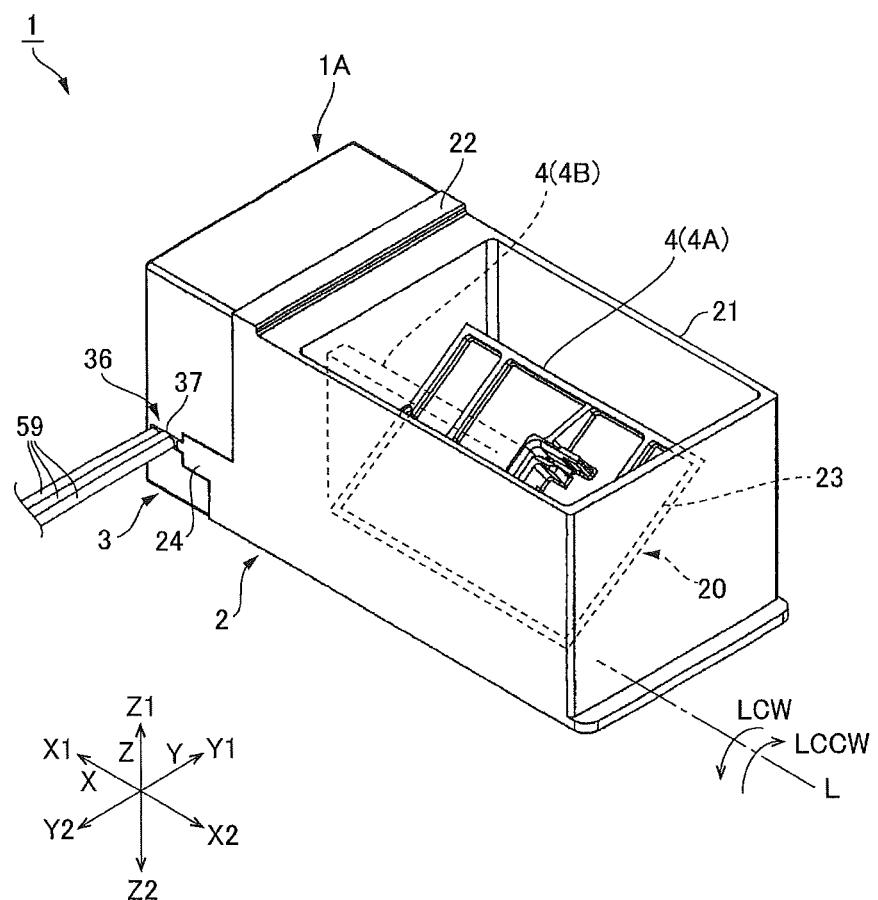
FIG. 1 is a perspective view showing a damper device in accordance with an embodiment of the present invention.
Figure 2:
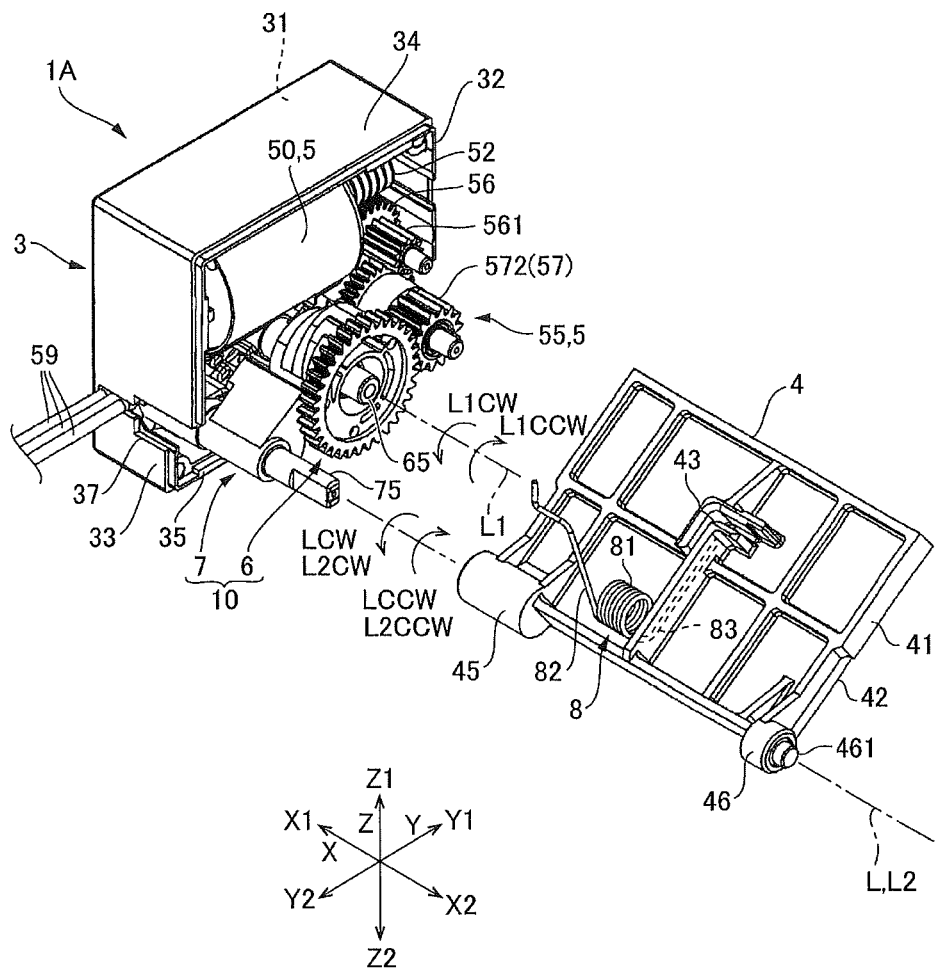
FIG. 2 is an exploded perspective view showing a damper device in which a frame is not shown.

FIG. 1 is a perspective view showing a damper device 1 in accordance with an embodiment of the present invention. FIG. 2 is an exploded perspective view showing the damper device 1 in which a frame 2 is not shown. In the present specification, the reference sign "L" is a turning center axial line of a baffle 4. Further, the first axial line "L1" is a rotation center axial line of a drive wheel 6 of a baffle drive mechanism 5 structured to drive the baffle 4, and the second axial line "L2" is a turning center axial line of a driven wheel 7. Further, a direction along the turning center axial line "L" is referred to as an "X" direction, a direction intersecting the turning center axial line "L" (direction in which cold air flows) is referred to as a "Z" direction, and a direction intersecting the "X" direction and the "Z" direction is referred to as a "Y" direction. Further, one side in the "X" direction is referred to as an "X1", the other side in the "X" direction is referred to as an "X2", one side in the "Y" direction is referred to as a "Y1", the other side in the "Y" direction is referred to as a "Y2", one side in the "Z" direction is referred to as a "Z1", and the other side in the "Z" direction is referred to as a "Z2".

As shown in FIGS. 1 and 2, the damper device 1 is a rectangular parallelepiped shape which is long in the "X" direction as a whole. The damper device 1 includes a frame 2 in which a rectangular opening part 20 is formed, a baffle 4 for opening and closing the opening part 20, and a baffle drive mechanism 5 structured to drive the baffle 4. A cover 3 which is a case accommodating the baffle drive mechanism 5 is attached to one end side in a longitudinal direction ("X" direction) of the frame 2. The frame 2 and the cover 3 (case) are made of resin. The frame 2 is provided with a tube part 21 having a rectangular cross section which is opened to both sides in the "Z" direction. The frame 2 is integrally formed with a partition 22 which separates an inside of the tube part 21 from a space where the baffle drive mechanism 5 is disposed on one side ("X1" direction side) in the longitudinal direction of the tube part 21. The cover 3 is engaged with the frame 2 by a hook mechanism not shown.

A frame-shaped seal part 23 is formed in the inside of the tube part 21 so as to be obliquely inclined with respect to the "Z" direction and the "Y" direction. An inner side of the seal part 23 is formed to be the opening part 20. The baffle 4 is turnably supported by the frame 2 around the turning center axial line "L" extended in the "X" direction on the inner side of the tube part 21. In a state shown in FIG. 1, the baffle 4 is abutted with the seal part 23 and is set in a closing posture 4A that the opening part 20 is closed by the baffle 4. When the baffle drive mechanism 5 drives and turns the baffle 4 to one side "LCW" around the turning center axial line "L" from this state to separate the baffle 4 from the seal part 23, the baffle 4 is set in an open posture 4B in which the opening part 20 is opened.

In this embodiment, the baffle 4 includes an opening and closing plate 41 whose size is larger than the opening part 20 and a sheet-shaped elastic member 42 (see FIG. 2) made of foamed polyurethane or the like which is stuck on a face on the opening part 20 side of the opening and closing plate 41. The elastic member 42 is abutted with a periphery (seal part 23) of the opening part 20 to close the opening part 20. Cold air is flowed from an opposite side (the other side "Z2" in the "Z" direction) to the side where the baffle 4 is disposed (one side "Z1" in the "Z" direction) with respect to the opening part 20 to the one side "Z1" in the "Z" direction through the opening part 20. Alternatively, cold air may be flowed from the side where the baffle 4 is disposed (one side "Z1" in the "Z" direction) with respect to the opening part 20 to the other side "Z2" in the "Z" direction through the opening part 20.

(Baffle Drive Mechanism)

Figure 3:
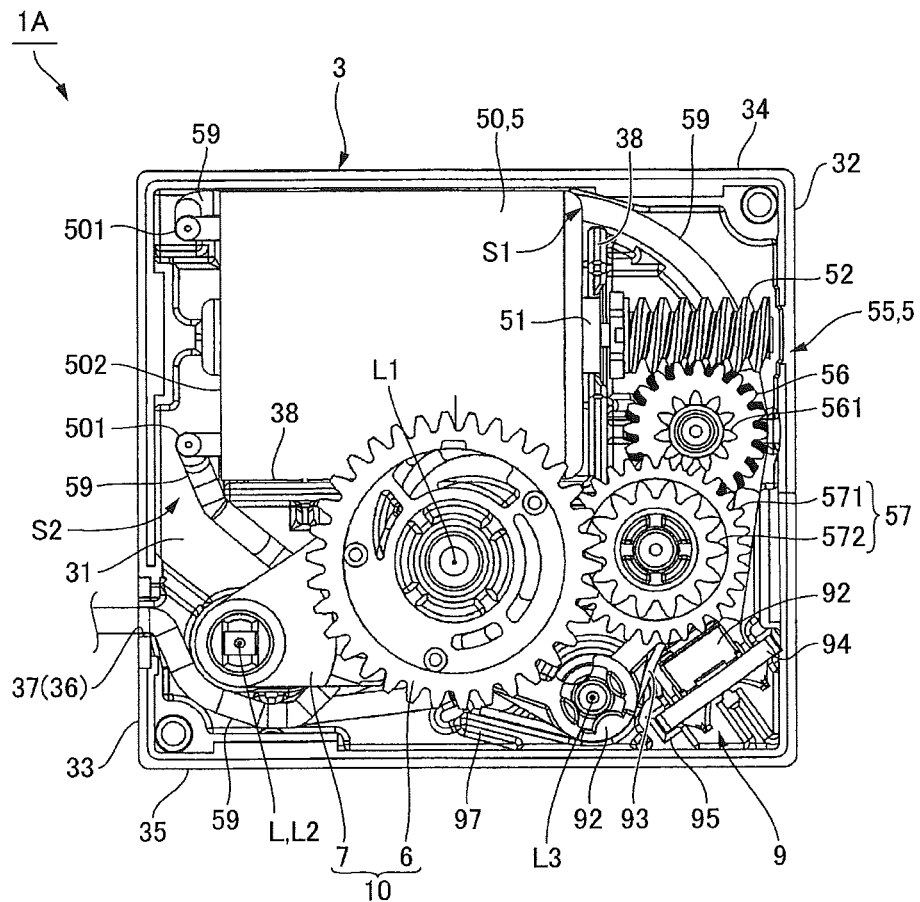
FIG. 3 is a plan view showing a cover and a baffle drive mechanism.

FIG. 3 is a plan view showing the cover 3 and the baffle drive mechanism 5. As shown in FIGS. 2 and 3, the baffle drive mechanism 5 includes a motor 50 and a transmission mechanism 55 structured to transmit rotation of the motor 50 to the baffle 4. The damper device 1 includes a geared motor 1A structured to turn the baffle 4, and the geared motor 1A accommodates the baffle drive mechanism 5 between the cover 3 and the frame 2 and is structured so as to be connected with lead wires 59. The transmission mechanism 55 includes a worm gear 52 formed on an output shaft 51 of the motor 50, a worm wheel 56 meshed with the worm gear 52, a composite gear 57 provided with a large diameter gear 571 which is meshed with a small diameter gear 561 formed in the worm wheel 56, and a rotation transmission mechanism 10 to which rotation of the composite gear 57 is transmitted through a small diameter gear 572 of the composite gear 57. Rotation of the rotation transmission mechanism 10 is transmitted to the baffle 4.

Various motors may be used as the motor 50. In this embodiment, a DC motor is used as the motor 50 and thus its control is easy. The motor 50 outputs rotation only in one direction around the motor axial line. In this embodiment, the motor 50 is rotated only in a direction for turning the baffle 4 to one side "LCW" (open direction) around the turning center axial line "L". In other words, the motor 50 outputs only a rotation driving force for driving a drive wheel 6 described below to one side "L1CCW" around the first axial line "L1".

(Rotation Transmission Mechanism)

As shown in FIGS. 2 and 3, the rotation transmission mechanism 10 includes a drive wheel 6, which is rotated to one side "L1CCW" around the first axial line "L1" extended in the "X" direction in parallel to the turning center axial line "L" of the baffle 4, a driven wheel 7 which is driven and turned by the drive wheel 6 to one side "L2CW" around the second axial line "L2" parallel to the first axial line "L1", and a torsion coil spring 8 that is an urging member which urges the driven wheel 7 to the other side "L2CCW" around the second axial line "L2". Further, the rotation transmission mechanism 10 includes a position sensor 9 structured to monitor an angular position of the drive wheel 6 or the driven wheel 7 (baffle 4).

In this embodiment, the driven wheel 7 is connected with the baffle 4. Therefore, the turning center axial line of the driven wheel 7 (second axial line "L2") is coincided with the turning center axial line "L" of the baffle 4. In the rotation transmission mechanism 10, when the drive wheel 6 is turned to one side "L1CCW" around the first axial line "L1", the driven wheel 7 is turned to one side "L2CW" around the second axial line "L2" and the baffle 4 is turned to one side "LCW" around the turning center axial line "L" and thus the baffle 4 is set to the open posture 4B. On the other hand, even in a case that the drive wheel 6 is turned to one side "L1CCW" around the first axial line "L1", when turning drive to the driven wheel 7 by the drive wheel 6 is stopped, the driven wheel 7 is turned to the other side "L2CCW" around the second axial line "L2" by an urging force of the torsion coil spring 8. Therefore, the baffle 4 is turned to the other side "LCCW" around the turning center axial line "L" to be set to the closing posture 4A, and further turning of the baffle 4 to the other side "LCCW" around the turning center axial line "L" is prevented by a stopper or the like provided in the frame 2.

As shown in FIGS. 1 and 2, the torsion coil spring 8 is disposed between the baffle 4 and the frame 2. The torsion coil spring 8 is provided with a coil part 81 and end parts 82 and 83 in a straight line shape which are extended in different directions from both ends in an axial line direction of the coil part 81. One end part 82 of the torsion coil spring 8 is held by an engaging part (not shown) provided on an inner face of the tube part 21, and the other end part 83 is held by an engaging part 43 which is provided on a rear side (opposite side to the elastic member 42) of the opening and closing plate 41 of the baffle 4. The torsion coil spring 8 urges the baffle 4 to the other side "LCCW" (closing direction) around the turning center axial line "L" and thereby the driven wheel 7 is urged to the other side "L2CCW" around the second axial line "L2".

Figure 4:
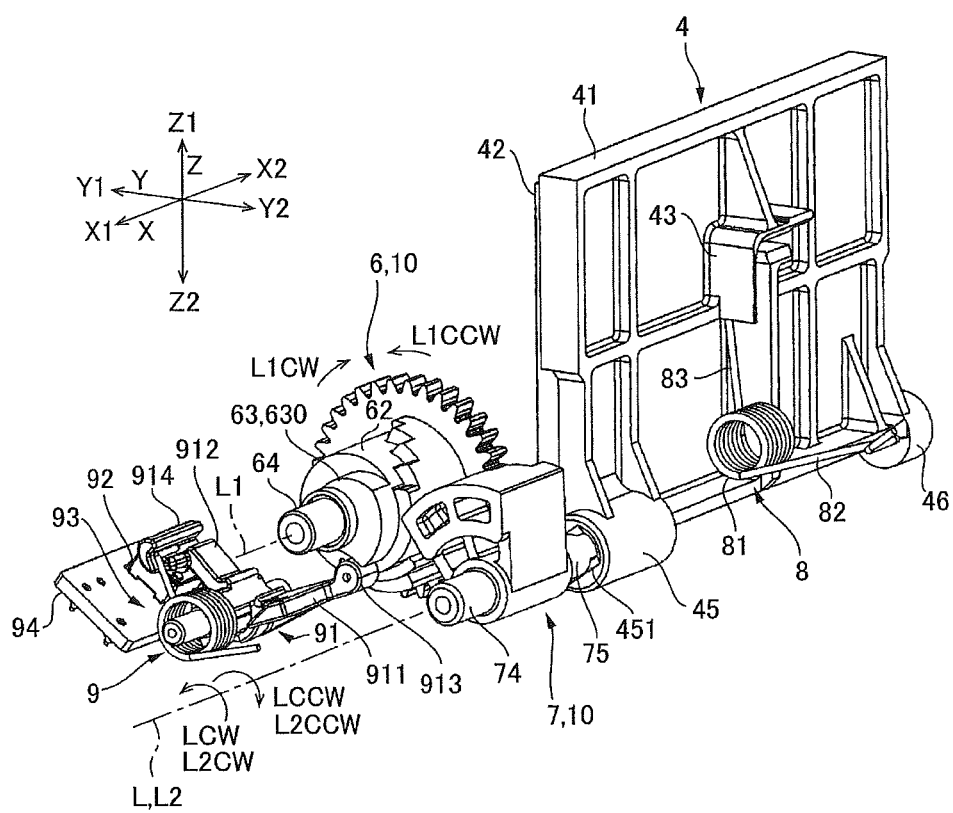
FIG. 4 is a perspective view showing a baffle, a rotation transmission mechanism and a position sensor.

FIG. 4 is a perspective view showing the baffle 4, the rotation transmission mechanism 10 and the position sensor 9. As shown in FIGS. 2 and 4, the driven wheel 7 is provided with a shaft part 75 for connecting the baffle 4. The shaft part 75 is protruded to an inner side of the tube part 21 through a penetration part which penetrates through the partition 22 of the frame 2 and is connected with the baffle 4. Shaft parts 45 and 46 are formed at both end edges in the turning center axial line "L" direction of the baffle 4. The shaft part 75 is fitted to a fitting recessed part 451 (see FIG. 4) which is formed in the shaft part 45. A protruded part 461 in a columnar shape (see FIG. 2) is formed at a tip end of the shaft part 46. The protruded part 461 is turnably held by a holding hole (not shown) which is formed in the tube part 21 of the frame 2.

(Drive Wheel and Driven Wheel)

Figure 5:
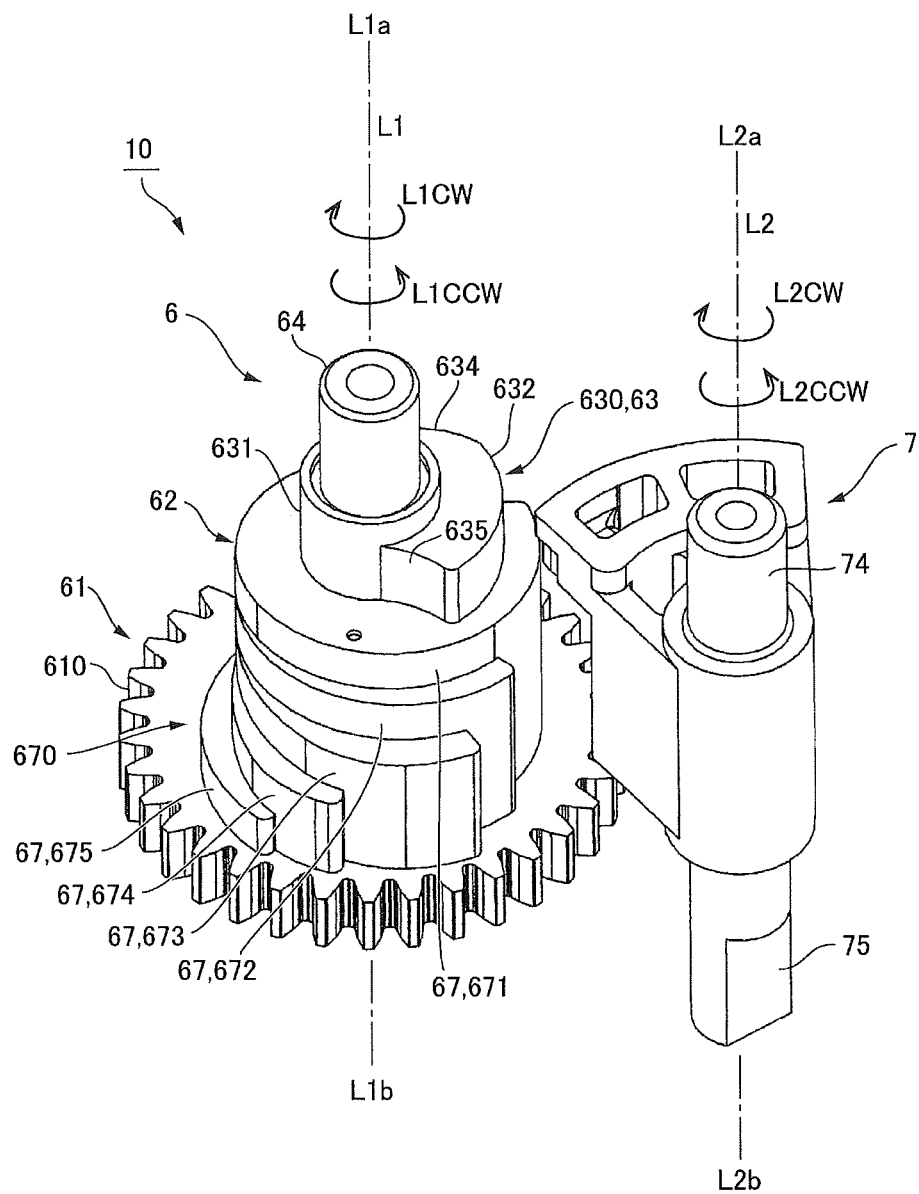
FIG. 5 is a perspective view showing a drive wheel and a driven wheel which are viewed from a side of a cam face forming part.
Figure 6:
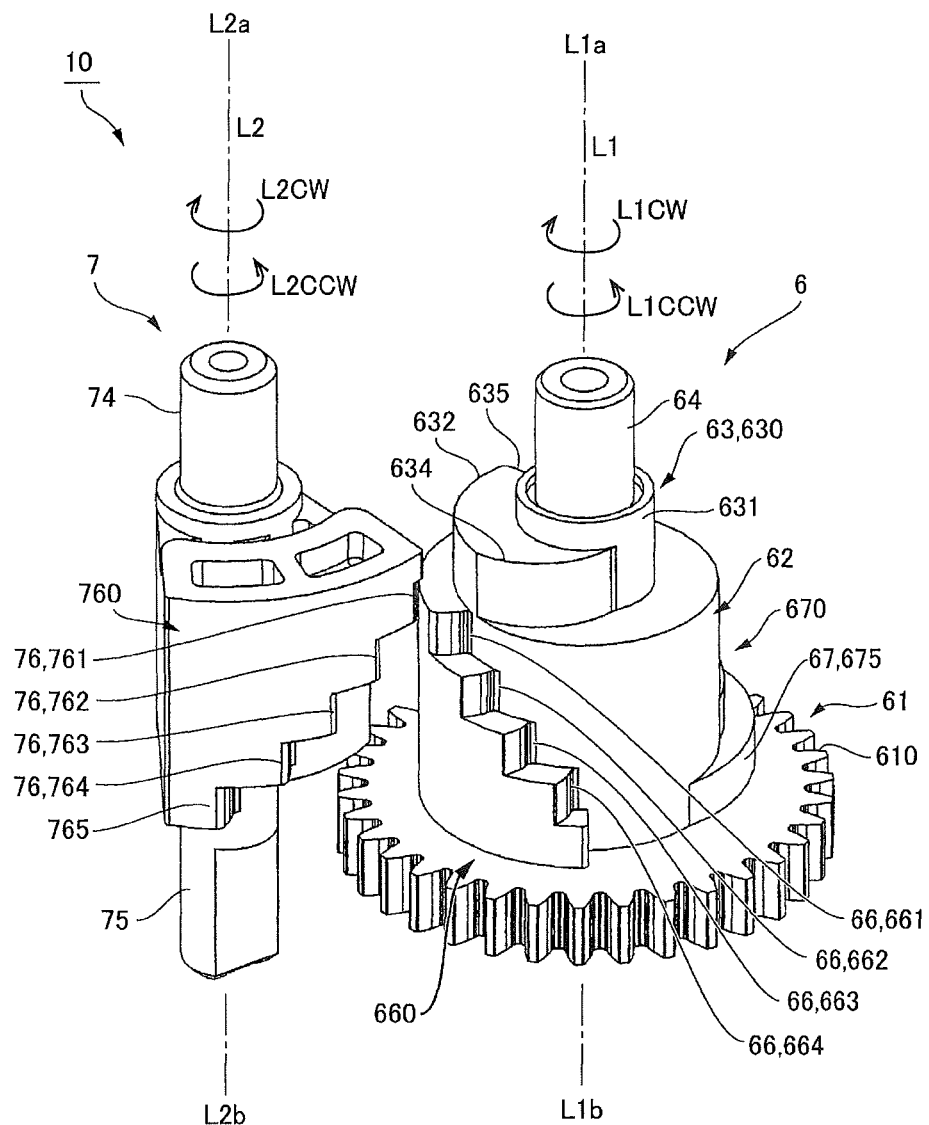
FIG. 6 is a perspective view showing a drive wheel and a driven wheel which are viewed from a side of drive teeth and driven teeth.
Figure 7A:
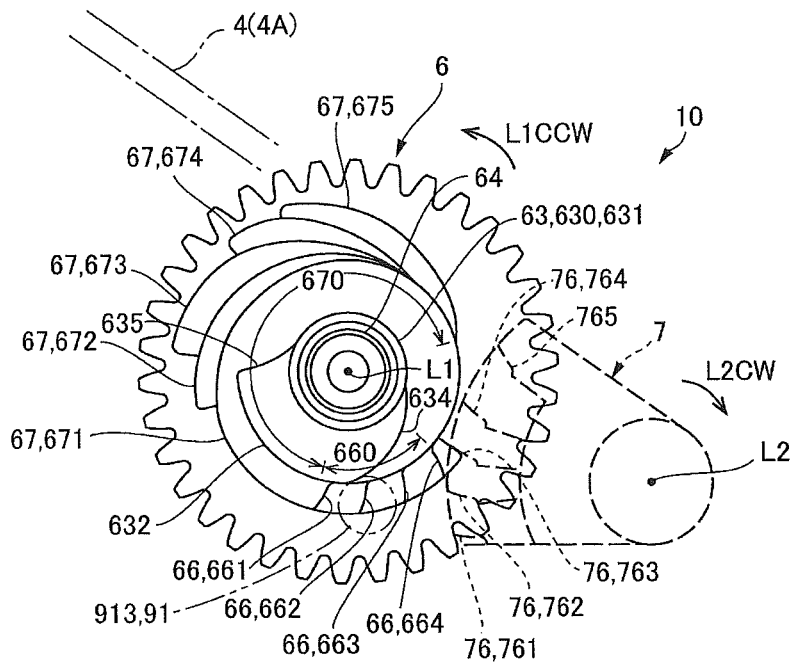
FIGS. 7A and 7B are explanatory views showing a planar structure of a drive wheel and a driven wheel.
Figure 7B:
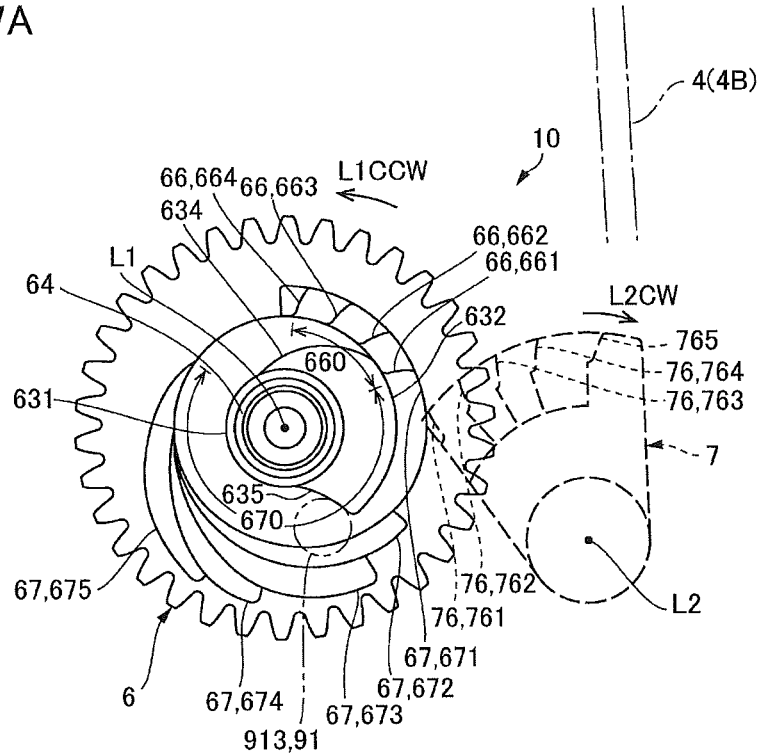

FIG. 5 is a perspective view showing the drive wheel 6 and the driven wheel 7 which are viewed from a side of a cam face forming part 670. FIG. 6 is a perspective view showing the drive wheel 6 and the driven wheel 7 which are viewed from a side of drive teeth 66 and driven teeth 76. Further, FIGS. 7A and 7B are explanatory views showing a planar structure of the drive wheel 6 and the driven wheel 7. FIG. 7A shows a state that the baffle 4 is set in the closing posture 4A and FIG. 7B shows a state that the baffle 4 is set in the open posture 4B.

As shown in FIGS. 5 and 6, the drive wheel 6 is provided with a circular plate part 61 whose outer peripheral face is formed with a gear 610, a first body part 62 in a columnar shape which is protruded from the center of the circular plate part 61 to one side "L1a" in the first axial line "L1" direction, a second body part 63 in a columnar shape which is protruded from the center of the first body part 62 to one side "L1a" of the first axial line "L1" direction, and a shaft part 64 in a columnar shape which is protruded from the center of the second body part 63 to one side "L1a" of the first axial line "L1" direction. Further, the drive wheel 6 is provided with a shaft part 65 (see FIGS. 2 and 3) which is protruded from the center of the circular plate part 61 to the other side "L1b" in the first axial line "L1" direction. The shaft parts 64 and 65 are rotatably supported by the partition 22 of the frame 2. As shown in FIGS. 2 and 3, the gear 610 formed in the drive wheel 6 is meshed with the small diameter gear 572 of the composite gear 57.

The drive wheel 6 is provided with a drive teeth forming part 660 where a plurality of drive teeth 66 structured to drive and turn the driven wheel 7 to one side "L2CW" around the second axial line "L2" is disposed in a circumferential direction, and a cam face forming part 670 on which the driven wheel 7 is slid when the driven wheel 7 is turned to the other side "L2CCW" around the second axial line "L2" by an urging force of the torsion coil spring 8. The drive teeth forming part 660 and the cam face forming part 670 are provided so as to be adjacent to each other in the circumferential direction.

On the other hand, the driven wheel 7 is provided with a driven teeth forming part 760 where a plurality of driven teeth 76 with which the drive teeth 66 are to be abutted in order when the drive wheel 6 is turned to one side "L1CCW" around the first axial line "L1" is disposed in the circumferential direction. In this embodiment, the driven wheel 7 is a sector gear and the driven teeth forming part 760 is structured by using its outer peripheral face. In the driven wheel 7, a shaft part 74 protruded to one side "L2a" in the second axial line "L2" direction and a shaft part 75 protruded to the other side "L2b" in the second axial line "L2" direction are formed at a center of the fan shape, and the shaft parts 74 and 75 are turnably supported by the partition 22 of the frame 2.

In the drive wheel 6, a plurality of drive teeth 66 is disposed at different positions in the first axial line "L1" direction and is formed in a multi-stage shape along the first axial line "L1" direction. A plurality of driven teeth 76 is provided at different positions in the second axial line "L2" direction so as to correspond to the structure of the drive wheel 6 and is formed in a multi-stage shape along the second axial line "L2" direction.

The rotation transmission mechanism 10 is structured so that, when the drive wheel 6 is turned to one side "L1CCW" around the first axial line "L1", the drive teeth 66 drive the driven wheel 7 to one side "L2CW" around the second axial line "L2" through the driven teeth 76 and, after that, when engagement of the drive teeth 66 with the driven teeth 76 is released, the driven wheel 7 is turned to the other side "L2CCW" around the second axial line "L2" by the urging force of the torsion coil spring 8. In this case, the driven wheel 7 is slid on the cam face forming part 670 provided in the drive wheel 6. Therefore, even in a case that the drive wheel 6 is turned to only one side "L1CCW" around the first axial line "L1", the driven wheel 7 can be turned to one side "L2CW" around the second axial line "L2" and, in addition, the driven wheel 7 can be turned to the other side "L2CCW" around the second axial line "L2".

(Drive Wheel)

As shown in FIG. 6, the drive wheel 6 is formed with totaled four (4) drive teeth 66 (first drive tooth 661, second drive tooth 662, third drive tooth 663 and fourth drive tooth 664) in a multi-stage shape along the first axial line "L1" direction. The four drive teeth 66 are respectively formed one by one at predetermined positions in the first axial line "L1" direction and, when viewed in the first axial line "L1" direction, the four drive teeth 66 are formed at equal angular intervals (see FIGS. 7A and 7B).

In the four drive teeth 66, the first drive tooth 661 formed on the most one side "L1a" in the first axial line "L1" direction is disposed on the most other side "L1CW" around the first axial line "L1", and the second drive tooth 662, the third drive tooth 663 and the fourth drive tooth 664 are disposed in this order along the one side "L1CCW" around the first axial line "L1" with respect to the first drive tooth 661. Therefore, in the four drive teeth 66, the fourth drive tooth 664 formed on the most other side "L1b" in the first axial line "L1" direction is located on the most one side "L1CCW" around the first axial line "L1". In other words, in this embodiment, the four drive teeth 66 are respectively formed so that the drive tooth 66 located on one side "L1a" in the first axial line "L1" direction is located on the other side "L1CW" around the first axial line "L1" with respect to the drive tooth 66 located on the other side "L1b" in the first axial line "L1" direction.

In this embodiment, the drive teeth 66 of the drive wheel 6 drive the driven wheel 7 only when the drive wheel 6 is turned to one side "L1CCW" around the first axial line "L1". Therefore, each of the four drive teeth 66 is, as shown in FIGS. 7A and 7B, formed so that a face on one side "L1CCW" around the first axial line "L1" is provided with a tooth face having an involute curve, and that a face from an end part on an outer side in a radial direction (tooth tip) of each of the four drive teeth 66 to the other side "L1CW" around the first axial line "L1" is formed to be a circular peripheral face which is continuously extended from the end part on the outer side in the radial direction of each of the four drive teeth 66 (see FIG. 6).

In this embodiment, each of the faces on the one side "L1CCW" around the first axial line "L1" of the second drive tooth 662, the third drive tooth 663 and the fourth drive tooth 664 of the four drive teeth 66 is formed to be a tooth face having a simple involute curve. On the other hand, the face of the first drive tooth 661 on the one side "L1CCW" around the first axial line "L1" is formed so that a curvature radius of the end part on the outer side in the radial direction is increased with an involute curve as a basis. Therefore, when an operation described below is performed, shifting to the full open position from a position just before a full open state can be performed smoothly. Further, a direction to which a force is applied is not rapidly changed and thus momentary impact noise or the like can be reduced.

(Driven Wheel)

As shown in FIG. 6, the driven wheel 7 is formed with totaled four (4) driven teeth 76 (first driven tooth 761, second driven tooth 762, third driven tooth 763 and fourth driven tooth 764) in a multi-stage shape along the second axial line "L2" direction. The four driven teeth 76 (first driven tooth 761, second driven tooth 762, third driven tooth 763 and fourth driven tooth 764) are respectively formed at positions corresponding to the four drive teeth 66 (first drive tooth 661, second drive tooth 662, third drive tooth 663 and fourth drive tooth 664). The four driven teeth 76 are respectively formed one by one at predetermined positions in the second axial line "L2" direction and, when viewed in the second axial line "L2" direction, the four driven teeth 76 are formed at equal angular intervals (see FIGS. 7A and 7B).

In the four driven teeth 76, the first driven tooth 761 formed on the most one side "L2a" in the second axial line "L2" direction is disposed on the most other side "L2CCW" around the second axial line "L2", and the second driven tooth 762, the third driven tooth 763 and the fourth driven tooth 764 are disposed in this order toward one side "L2CW" around the second axial line "L2" from the first driven tooth 761. Therefore, in the four driven teeth 76, the fourth driven tooth 764 formed on the most other side "L2b" in the second axial line "L2" direction is located on the most one side "L2CW" around the second axial line "L2".

Accordingly, in the plurality of the driven teeth 76, the driven tooth 66 located on one side "L2a" in the second axial line "L2" direction is located on the other side "L2CCW" around the second axial line "L2" with respect to the driven tooth 76 located on the other side "L2b" in the second axial line "L2" direction.

In this embodiment, the drive teeth 66 are abutted with the driven teeth 76 only from the other side "L2CCW" around the second axial line "L2". Therefore, each of the four driven teeth 76 is formed so that a face on the other side "L2CCW" around the second axial line "L2" is provided with a tooth face having an involute curve, and that a portion from end parts (tooth tip) on an outer side in a radial direction of the four driven teeth 76 to the one side "L2CW" around the second axial line "L2" is formed to be a circular peripheral face which is continuously extended from the end parts on the outer side in the radial direction of the four driven teeth 76 (see FIG. 6).

Further, the driven teeth forming part 760 of the driven wheel 7 is provided with a final driven tooth 765 on one side "L2CW" around the second axial line "L2" with respect to the plurality of the driven teeth 76 and on the other side "L2b" in the second axial line "L2" direction with respect to the plurality of the driven teeth 76 so as not to abut with the drive teeth 66 when the drive wheel 6 is turned to one side "L1CCW" around the first axial line "L1".

In this embodiment, respective pitches of the four driven teeth 76 (first driven tooth 761, second driven tooth 762, third driven tooth 763 and fourth driven tooth 764) are equal to each other. On the other hand, a pitch between the fourth driven tooth 764 and the final driven tooth 765 located on the most one side "L2CW" around the second axial line "L2" is wider than the pitch of the four driven teeth 76. For example, the pitch between the fourth driven tooth 764 and the final driven tooth 765 is set in a range from 1.1 times to 1.8 times of the pitch of the plurality of the driven teeth 76. In this embodiment, the pitch between the fourth driven tooth 764 and the final driven tooth 765 is set to 1.25 times of the pitch of the plurality of the driven teeth 76.

(Cam Face Forming Part)

The drive wheel 6 is structured with a cam face forming part 670 on a circular peripheral face formed on the other side "L1CW" around the first axial line "L1" with respect to the drive teeth forming part 660. The cam face forming part 670 is disposed at different positions in the first axial line "L1" direction with a plurality of cam faces 67 on which the driven teeth 76 are sequentially slid when the driven wheel 7 is turned to the other side "L2CCW" around the second axial line "L2" by the urging force of the torsion coil spring 8. The plurality of the cam faces 67 is formed in a multi-stage shape along the first axial line "L1" direction.

The cam face forming part 670 is formed with four cam faces 67 (first cam face 671, second cam face 672, third cam face 673 and fourth cam face 674) so as to correspond to the four driven teeth 76. Further, the cam face forming part 670 is provided with a final cam face 675 with which the final driven tooth 765 of the driven wheel 7 is abutted. Therefore, the cam face forming part 670 is formed with totaled five (5) cam faces 67.

In the five cam faces 67, the first cam face 671 formed on the most one side "L1a" in the first axial line "L1" direction is disposed on the most one side "L1CCW" around the first axial line "L1". The second cam face 672, the third cam face 673, the fourth cam face 674 and the final cam face 675 are disposed in this order along the other side "L1CW" around the first axial line "L1" with respect to the first cam face 671. Therefore, in the five cam faces 67, the final cam face 675 formed on the most other side "L1b" in the first axial line "L1" direction is located on the most other side "L1CW" around the first axial line "L1". Accordingly, in the plurality of the cam faces 67, the cam face 67 located on one side "L1a" in the first axial line "L1" direction is located on one side "L1CCW" around the first axial line "L1" with respect to the cam face 67 located on the other side "L1b" in the first axial line "L1" direction.

Each of the five cam faces 67 is formed of a circular arc face which is extended in a circular arc shape from one side "L1CCW" around the first axial line "L1" to the other side "L1CW" and the driven teeth 76 are slid on parts of the five cam faces 67 in the circumferential direction. Therefore, the cam faces adjacent to each other in the circumferential direction of the five cam faces 67 are overlapped with each other over a certain angular range. In this embodiment, the first cam face 671 is extended in the circumferential direction from an end part on an outer side in the radial direction of the first drive tooth 661. Further, in each of the plurality of the cam faces 67, its end part on the most one side "L1CCW" around the first axial line "L1" is located on an outer side in the radial direction with respect to the adjacent cam face 67 on one side "L1CCW" around the first axial line "L1".

A diameter of each of the five cam faces 67 is reduced from one side "L1CCW" around the first axial line "L1" toward the other side "L1CW" and is reached to an outer peripheral face of the first body part 62 which is continuously extended from the tooth bottoms of the drive teeth 66 to the other side "L1CW" around the first axial line "L1". Further, in the final cam face 675, a reducing rate of an outer diameter in the circumferential direction of a portion located on one side "L1CCW" around the first axial line "L1" is smaller than that of other cam faces 67 (first cam face 671, second cam face 672, third cam face 673 and fourth cam face 674). In addition, a reducing rate of an outer diameter in the circumferential direction of a portion of the final cam face 675 located on the other side "L1CW" around the first axial line "L1" is larger than that of other cam faces 67. Further, in the second cam face 672, an end part on the most one side "L1CCW" around the first axial line "L1" is located on an inner side in the radial direction with respect to the cam faces 67 (third cam face 673, fourth cam face 674 and final cam face 675) provided on the other side "L1CW" around the first axial line "L1". Therefore, when an operation described below is to be performed, the third driven tooth 763, the fourth driven tooth 764 and the final driven tooth 765 which are disposed in subsequent stages to the second driven tooth 762 are not interfered with a portion extended from the second cam face 672 to the other side "L1b" in the first axial line "L1" direction.

Further, in this embodiment, as described below with reference to FIGS. 9 and 10, it is structured that, in respective regions where the plurality of the driven teeth 76 is sequentially slid on the plurality of the cam faces 67, the subsequent driven tooth 76 or the final driven tooth 765 for the next region is contacted with the cam face 67 while the driven tooth 76 in the current region has been contacted with the cam face.

(Position Sensor)

As shown in FIG. 4, the rotation transmission mechanism 10 in this embodiment includes a position sensor 9 structured to monitor an angular position of the drive wheel 6 or the driven wheel 7 (baffle 4). In this embodiment, the position sensor 9 is structured to monitor an angular position of the drive wheel 6. Further, the position sensor 9 is a pressing type switch mechanism, and the position sensor 9 corresponds to the switch mechanism in at least an embodiment of the present invention.

The position sensor 9 includes a turnable lever 91 which is displaced by a sensor cam face 630 provided in the second body part 63 of the drive wheel 6, and a switch 92 whose state is switched by displacement of the turnable lever 91. The sensor cam face 630 is provided with a small diameter part 631, a diameter enlarging part 634, a large diameter part 632 and a diameter reducing part 635 along the other side "L1CW" around the first axial line "L1".

The switch 92 is, for example, a pressing type switch and is turned on and off by displacement of the turnable lever 91. The switch 92 may be another type of switch other than a pressing type switch. For example, a potentiometer may be used by which a variation amount such as displacement of the turnable lever 91 is detected as a variation of voltage. The turnable lever 91 is provided with a shaft part 910 which is turnably supported by a lever holding part 96 (see FIG. 12) formed in the cover 3, a first arm part 911 which is protruded from the shaft part 910 toward the sensor cam face 630 of the drive wheel 6, and a second arm part 912 which is protruded from the shaft part 910 toward the switch 92. A tip end of the first arm part 911 is provided with a first abutting part 913 in a circular shape which slides on the sensor cam face 630, and a tip end of the second arm part 912 is provided with a second abutting part 914 which is capable of being abutted with the switch 92.

A torsion coil spring 93 which is an urging member supported by the cover 3 is provided for the turnable lever 91. One end part 931 of the torsion coil spring 93 is supported by a spring support wall 97 formed in the cover 3, and the other end part 932 of the torsion coil spring 93 is supported by a second abutting part 914 which is provided at a tip end of the second arm part 912 of the turnable lever 91. Therefore, the second arm part 912 is urged toward the switch 92 by the torsion coil spring 93. Accordingly, in a region where the first abutting part 913 provided at the tip end of the first arm part 911 is abutted with the small diameter part 631 of the sensor cam face 630, the second abutting part 914 of the second arm part 912 presses the switch 92. On the other hand, in a region where the first abutting part 913 provided at the tip end of the first arm part 911 is abutted with the large diameter part 632 of the sensor cam face 630, the second abutting part 914 of the second arm part 912 is separated from the switch 92. Therefore, when an on and off state of the switch 92 is monitored, an angular position of the drive wheel 6 is detected and thus an angular position of the driven wheel 7 and the baffle 4 can be monitored.

The position sensor 9 is structured so that, as described below with reference to FIG. 12, after the driven wheel 7 is turned to the most one side "L2CW" around the second axial line "L2", an output from the switch 92 is switched at a midway position of a first region where the driven wheel 7 is stopped and, after the driven wheel 7 is turned to the most other side "L2CCW" around the second axial line "L2", the output from the switch 92 is switched at a midway position of a second region where the driven wheel 7 is stopped. Since the position sensor 9 is structured so that an output from the switch 92 is switched at a midway position of a region where the driven wheel 7 is stopped, even when a turning position of the drive wheel 6 is deviated to some extent due to a dimensional error of a component or the like, an accurate angular position of the driven wheel 7 (baffle 4) can be detected. Therefore, malfunction of the baffle drive mechanism 5 can be suppressed.

(Operation of Rotation Transmission Mechanism)

Figure 8:
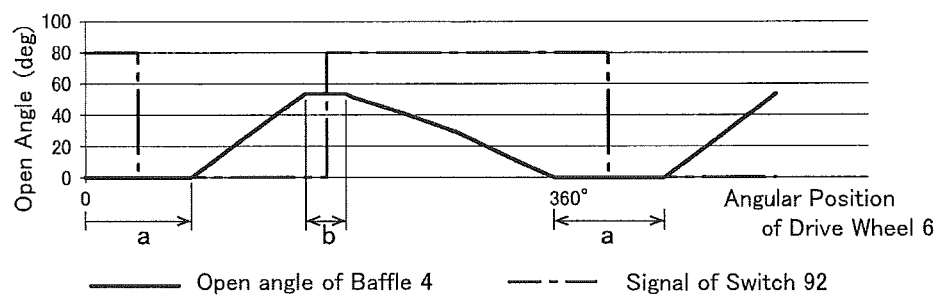
FIG. 8 is an explanatory view showing a relationship between an angular position of a drive wheel and an open angle of a baffle.

FIG. 8 is an explanatory view showing a relationship between an angular position of the drive wheel 6 and an open angle of the baffle 4. In FIG. 8, an open angle of the baffle 4 is indicated by a solid line and a change of an output from the switch 92 of the position sensor 9 is indicated by an alternate long and short dash line. An operation of the rotation transmission mechanism 10 will be described below with reference to FIGS. 7A, 7B and 8. As shown in FIG. 7A, in a state that the baffle 4 is set in a closing posture 4A, after the driven wheel 7 is turned to the most other side "L2CCW" around the second axial line "L2", the driven wheel 7 is set in a stopped state. In this state, the baffle 4 is urged to the closing direction (LCCW) by the torsion coil spring 8. However, the baffle 4 is not further turned to the closing direction (LCCW) by a stopper provided for the baffle or the like.

When the motor 50 is operated in the state shown in FIG. 7A, the drive wheel 6 is turned to the one side "L1CCW" around the first axial line "L1". In a region until the fourth drive tooth 664 of the drive wheel 6 is abutted with the fourth driven tooth 764 of the driven wheel 7 (region "a" shown in FIG. 8), the driven wheel 7 and the baffle 4 are in a stationary state. Further, in a region where the first abutting part 913 of the turnable lever 91 is abutted with the large diameter part 632 of the sensor cam face 630, the position sensor 9 is set in a state that an output from the switch 92 is off.

When the fourth drive tooth 664 of the drive wheel 6 is abutted with the fourth driven tooth 764 of the driven wheel 7, the driven wheel 7 begins to turn to one side "L2CW" around the second axial line "L2" against the urging force of the torsion coil spring 8. As a result, the baffle 4 begins to turn to one side "LCW" (open direction) around the turning center axial line "L". When the drive wheel 6 is further turned, the driven wheel 7 is also further turned and the third drive tooth 663 is abutted with the third driven tooth 763 of the driven wheel 7. Subsequently, the second drive tooth 662 is abutted with the second driven tooth 762 of the driven wheel 7 and then, the first drive tooth 661 is abutted with the first driven tooth 761 of the driven wheel 7 and, after that, the driven wheel 7 is turned until a tooth tip of the first drive tooth 661 rides on a tooth tip of the first driven tooth 761 of the driven wheel 7. As a result, the baffle 4 is set in the open posture 4B.

Next, when the drive wheel 6 is further turned to the one side "L1CCW" around the first axial line "L1", engagement of the first drive tooth 661 of the drive wheel 6 with the first driven tooth 761 of the driven wheel 7 is released and thus the driven wheel 7 is going to turn to the other side "L2CCW" around the second axial line "L2" by the urging force of the torsion coil spring 8. However, the first driven tooth 761 is abutted with the first cam face 671 and thus the driven wheel 7 is prevented from being turned to the other side "L2CCW" around the second axial line "L2". Therefore, the stopped state that the driven wheel 7 is stopped on the most one side "L2CW" around the second axial line "L2" is maintained (region "b" shown in FIG. 8). Accordingly, the baffle 4 is also maintained in the stopped state in the open posture 4B and the first driven tooth 761 slides on the first cam face 671.

FIG. 7B shows a state that the first driven tooth 761 is sliding on the first cam face 671. The driven wheel 7 and the baffle 4 are stopped in the open posture 4B until the first driven tooth 761 is reached to a portion where a diameter of the first cam face 671 is reduced on the other side "L1CW" around the first axial line "L1" of the first cam face 671.

Further, in the position sensor 9, the first abutting part 913 of the turnable lever 91 is moved from the large diameter part 632 of the sensor cam face 630 to the small diameter part 631 through the diameter reducing part 635 at a midway position of the stop region (region "b" shown in FIG. 8). Therefore, an output from the switch 92 is turned from off to on. FIG. 7B shows a state that the first abutting part 913 of the turnable lever 91 is moving to the small diameter part 631 of the sensor cam face 630.

When the first driven tooth 761 is reached to a portion where a diameter of the first cam face 671 is reduced on the other side "L1CW" around the first axial line "L1" of the first cam face 671, the driven wheel 7 begins to turn to the other side "L2CCW" around the second axial line "L2" by the urging force of the torsion coil spring 8. Therefore, the baffle 4 begins to turn to the other side "LCCW" (closing direction) around the turning center axial line "L".

When the drive wheel 6 is further turned to one side "L1CCW" around the first axial line "L1", the second driven tooth 762 is contacted with the second cam face 672 in a state that the first driven tooth 761 is contacted with the first cam face 671. Then, the second driven tooth 762 slides on the second cam face 672. Subsequently, the first driven tooth 761 is separated from the first cam face 671 and, in a state that the second driven tooth 762 is contacted with the second cam face 672, the third driven tooth 763 is contacted with the third cam face 673 and the third driven tooth 763 slides on the third cam face 673. Then, the second driven tooth 762 is separated from the second cam face 672 and, in a state that the third driven tooth 763 is contacted with the third cam face 673, the fourth driven tooth 764 is contacted with the fourth cam face 674 and the fourth driven tooth 764 slides on the fourth cam face 674. In addition, the third driven tooth 763 is separated from the third cam face 673 and, in a state that the fourth driven tooth 764 is contacted with the fourth cam face 674, the final driven tooth 765 is contacted with the final cam face 675 and the final driven tooth 765 slides on the final cam face 675.

The driven wheel 7 is turned to the other side "L2CCW" around the second axial line "L2" by the urging force of the torsion coil spring 8 until the final driven tooth 765 is separated from the final cam face 675 and, after that, the driven wheel 7 is stopped. Therefore, the baffle 4 is stopped in a state of the closing posture 4A. Meanwhile, even when the first drive wheel 6 is further turned to one side "L1CCW" around the axial line "L1", the driven wheel 7 and the baffle 4 are stopped (region "a" shown in FIG. 8) until the fourth drive tooth 664 is abutted with the fourth driven tooth 764. At a midway position of the stopped region, the first abutting part 913 of the turnable lever 91 used in the position sensor 9 is moved from the small diameter part 631 of the sensor cam face 630 to the large diameter part 632 through the diameter enlarging part 634. Therefore, an output from the switch 92 is turned from on to off.

After that, when the drive wheel 6 is further turned to the one side "L1CCW" around the first axial line "L1", the above-mentioned operation is repeated.

(Wiring of Lead Wire)

In this embodiment, when the baffle drive mechanism 5 is to be assembled between the frame 2 and the cover 3 (case), first, as shown in FIGS. 2 and 3, the baffle drive mechanism 5 is assembled to an inner side of the cover 3 and, after that, the frame 2 and the cover 3 are engaged and fixed to each other. The cover 3 is provided with a rectangular bottom part 31, a first wall 32 which is stood up from an edge on one side "Y1" in the "Y" direction of the bottom part 31, a second wall 33 which is stood up from an edge on the other side "Y2", a third wall 34 which is stood up from an edge on one side "Z1" in the "Z" direction of the bottom part 31, and a fourth wall 35 which is stood up from an edge on the other side "Z2".

As shown in FIG. 1, a wiring outlet 36 for extending lead wires 59 outside from an inner side of the cover 3 is formed between the frame 2 and the cover 3. The lead wires 59 are held between the cover 3 and the frame 2 in the wiring outlet 36. The wiring outlet 36 is formed between a cut-out part 37, which is formed by cutting the second wall 33 of the cover 3 to one side "X1" in the "X" direction, and a tip end of a protruded part 24 which is protruded from the frame 2 to the cut-out part 37 and is fitted to an opening part of the cut-out part 37. Three lead wires 59 are passed through the wiring outlet 36 and one of them is connected to the motor 50. Other two lead wires are connected to the position sensor 9.

Figure 9:
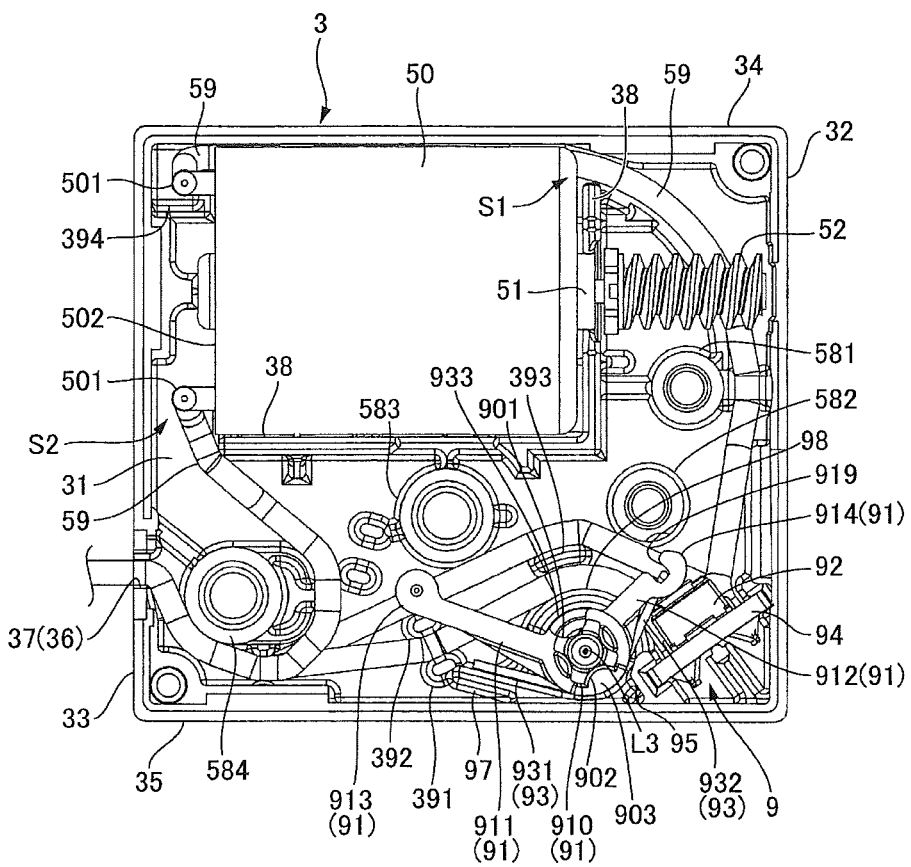
FIG. 9 is a plan view showing a cover, a lead wire, a position sensor, a motor and a worm gear.
Figure 9:
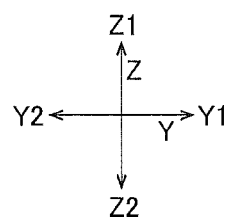
Figure 10:
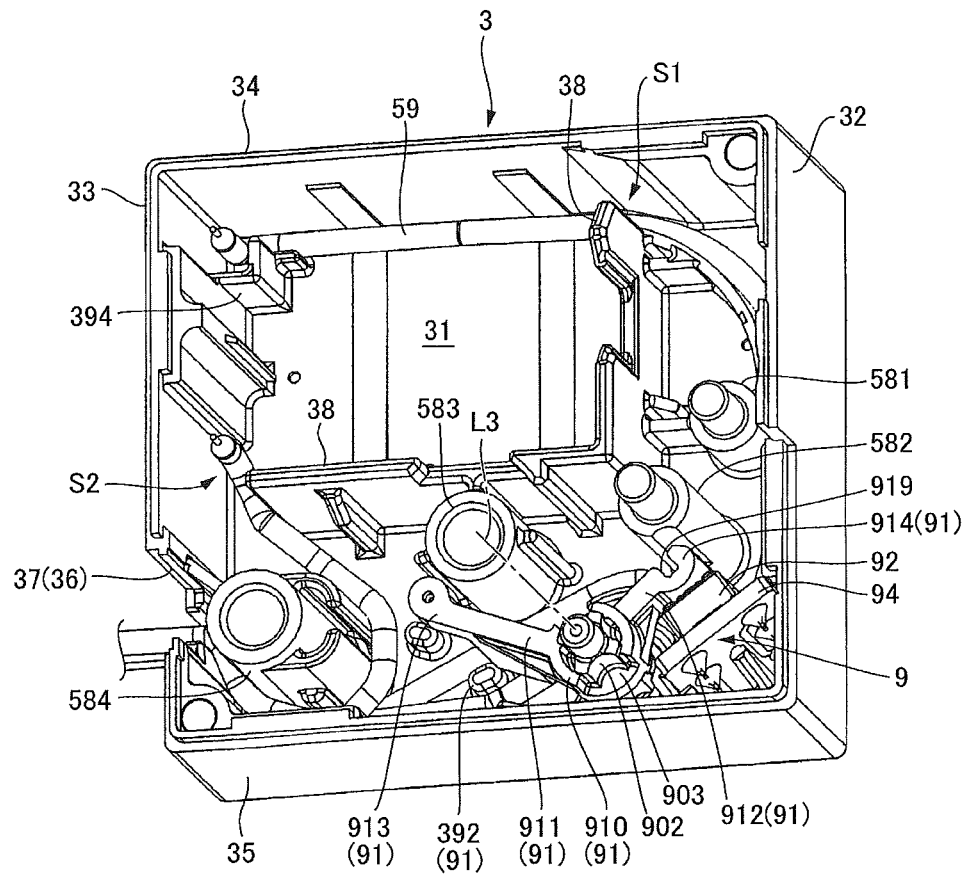
FIG. 10 is a perspective view showing a cover, a lead wire and a position sensor.

FIG. 9 is a plan view showing the cover 3, the lead wires 59, the position sensor 9, the motor 50 and the worm gear 52. Further, FIG. 10 is a perspective view showing the cover 3, the lead wires 59 and the position sensor 9. The motor 50 is disposed so that a longitudinal direction ("Y" direction) of the cover 3 and a motor axial line direction are coincided with each other, and the motor 50 is disposed at a corner part where the second wall 33 and the third wall 34 of the cover 3 intersect each other. The bottom part 31 of the cover 3 is formed with a partition wall 38 so as to surround the motor 50. A space between the partition wall 38 and the first wall 32 and the fourth wall 35 of the cover 3 is formed to be a space for disposing the transmission mechanism 55 and the position sensor 9. The partition wall 38 is a wall part formed in a bent shape which is structured of a portion, which is extended in parallel to the first wall 32 and the second wall 33 ("Z" direction) and is disposed at a position closer to the first wall 32 of the cover 3, and a portion which is extended in parallel to the third wall 34 and the fourth wall 35 ("Y" direction) between the third wall 34 and the fourth wall 35, the two portions being connected with each other at a right angle. An extended portion of the partition wall 38 in the "Z" direction is extended to the vicinity of the third wall 34. However, the partition wall 38 is not connected with the third wall 34. Further, an extended portion of the partition wall 38 in the "Y" direction is extended to the vicinity of the second wall 33. However, the partition wall 38 is not connected with the second wall 33.

The position sensor 9 is disposed in a corner part where the first wall 32 and the fourth wall 35 are connected with each other. The position sensor 9 is a switch mechanism including a pressing type switch 92. The switch 92 is mounted on a switch circuit board 94 which is held by the cover 3. A circuit board holding part 95 provided with a holding groove for holding the switch circuit board 94 is formed in the corner part where the first wall 32 and the fourth wall 35 of the cover 3 are connected with each other. The switch circuit board 94 is disposed so that its face on which the switch 92 is fixed faces in the diagonal direction of the cover 3. Two lead wires 59 passing through the wiring outlet 36 are connected with the switch circuit board 94. Further, one lead wire 59 is provided from the switch circuit board 94 to the motor 50.

The worm gear 52 attached to the output shaft 51 of the motor 50 is protruded between the partition wall 38 and the first wall 32. Motor terminals 501 with which the lead wires 59 are connected are provided on a motor rear end face 502 which faces the second wall 33 of the cover 3 on an opposite side to the worm gear 52 in the motor axial line direction. Gap spaces "S1" and "S2" for passing the lead wires 59 are respectively formed between an end part of the extended portion in the "Z" direction of the partition wall 38 and the third wall 34 and between an end part of the extended portion in the "Y" direction of the partition wall 38 and the second wall 33.

The bottom part 31 of the cover 3 is formed with rotation support parts which support gears structuring the transmission mechanism 55 at four positions. A first rotation support part 581 which supports the worm wheel 56 is disposed between the partition wall 38 and the first wall 32. A second rotation support part 582 which supports the composite gear 57 is disposed between the first rotation support part 581 and the position sensor 9. Further, a third rotation support part 583 which supports the drive wheel 6 and a fourth rotation support part 584 which supports the driven wheel 7 are disposed in this order between the second rotation support part 582 and the second wall 33.

As shown in FIG. 9, three lead wires 59 is passed through a space between the fourth rotation support part 584 and the fourth wall 35 from the wiring outlet 36 formed in the second wall 33. One of the lead wires 59 is wound around an outer periphery of the fourth rotation support part 584 and is extended to the space "S2" between the partition wall 38 and the second wall 33 and then, the lead wire 59 is extended from the space "S2" to the motor rear end face 502 and is connected with the motor terminal 501. Since the partition wall 38 is not connected with the second wall 33, the space "S2" is existed between an end part of the partition wall 38 and the second wall 33 and the space "S2" serves as a holding part of the lead wire 59. When the lead wire 59 is passed through the space "S2" between the partition wall 38 and the second wall 33, a contact angle of the lead wire 59 with an outer peripheral edge of the motor rear end face 502 is restricted by the partition wall 38. Therefore, disconnection of the lead wire 59 by an edge of the outer peripheral edge of the motor rear end face 502 is restrained.

In the three lead wires 59 passed through a space between the fourth rotation support part 584 and the fourth wall 35 from the wiring outlet 36, two other lead wires 59 are passed through a space between the third rotation support part 583 and the turnable lever 91 of the position sensor 9 and are connected with the switch circuit board 94 of the position sensor 9. The cover 3 is formed with wire holding protruded parts 391, 392 and 393, as a protruded part for holding a lead wire, which hold the lead wires 59 going from the wiring outlet 36 to the position sensor 9.

The wire holding protruded parts 391 and 392 are disposed between the position sensor 9 and the fourth rotation support part 584. One of the two lead wires 59 is held between the wire holding protruded parts 391 and 392, and the other lead wire 59 is held between the wire holding protruded part 392 and the third rotation support part 583. The wire holding protruded part 393 is disposed on an outer peripheral side with respect to an outer side cylindrical tube part 98 for holding the torsion coil spring 93 of the position sensor 9 described below. One lead wire 59 is held between the outer side cylindrical tube part 98 and the wire holding protruded part 393, and one lead wire 59 is held between the wire holding protruded part 393 and the second rotation support part 582.

A space between the position sensor 9 and the fourth rotation support part 584 is used as a space where the turnable lever 91 is turned. The lead wires 59 extended from the wiring outlet 36 to the position sensor 9 and connected with the switch circuit board 94 are disposed along the bottom part 31 of the cover 3. The lead wires 59 are passed through between a region where the first arm part 911 of the turnable lever 91 and the second arm part 912 are turned (turnable range of the turnable lever 91) and the bottom part 31. The lead wires 59 are held by the wire holding protruded parts 391, 392 and 393 so as not to float from the bottom part 31. In other words, the wire holding protruded parts 391, 392 and 393 are capable of holding the lead wires 59 so as not to contact with the turnable lever 91.

The lead wire 59 which connects the switch circuit board 94 with the motor 50 is extended along the first wall 32 from the switch circuit board 94 and is held between the first wall 32 and the first rotation support part 581 to be extended to the space "S1" between the partition wall 38 and the third wall 34. Further, the lead wire 59 is extended to the motor rear end face 502 along the third wall 34 and is connected with the motor terminal 501. A wire holding protruded part 394 which holds the lead wire 59 at a position along the third wall 34 is formed in a corner part where the third wall 34 and the second wall 33 are connected with each other. The wire holding protruded part 394 holds the lead wire 59 so that an outer peripheral edge of the motor rear end face 502 and the lead wire 59 are not contacted with each other. Therefore, contacting of the lead wire 59 with an edge of the outer peripheral edge of the motor rear end face 502 is restrained and thus disconnection of the lead wire 59 by the edge is restrained.

As shown in FIG. 9, the motor 50 is attached so as to cover a portion of the lead wire 59 connecting the switch circuit board 94 with the motor 50 extended along the third wall 34. In other words, in this embodiment, a wiring space for the lead wire 59 extended from a side of the output shaft 51 of the motor 50 to a side of the motor rear end face 502 is provided between the motor 50 and the bottom part 31 of the cover 3. Therefore, when the lead wire 59 is to be extended from the output shaft 51 side to the motor rear end face 502, the lead wire 59 is not required to be passed over the motor 50. Therefore, when the frame 2 is to be fixed to the cover 3 into which the baffle drive mechanism 5 has been assembled, the lead wire 59 is prevented from being bitten and crushed between the cover 3 and the frame 2.

(Assembling of Turnable Lever and Torsion Coil Spring)

Figure 11:
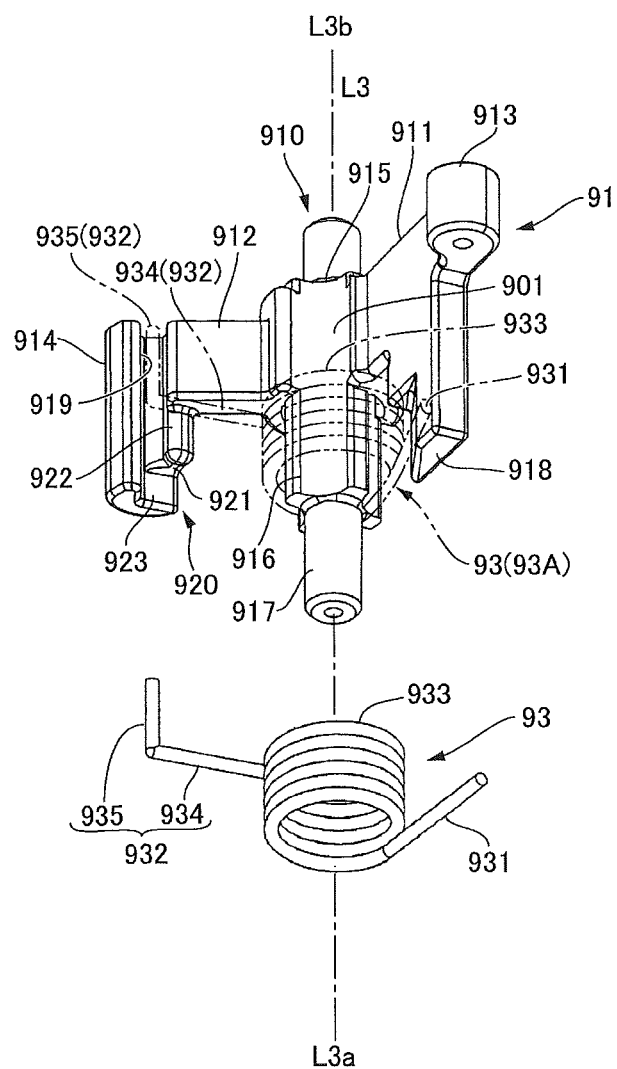
FIG. 11 is an exploded perspective view showing a turnable lever and a torsion coil spring.
Figure 13:
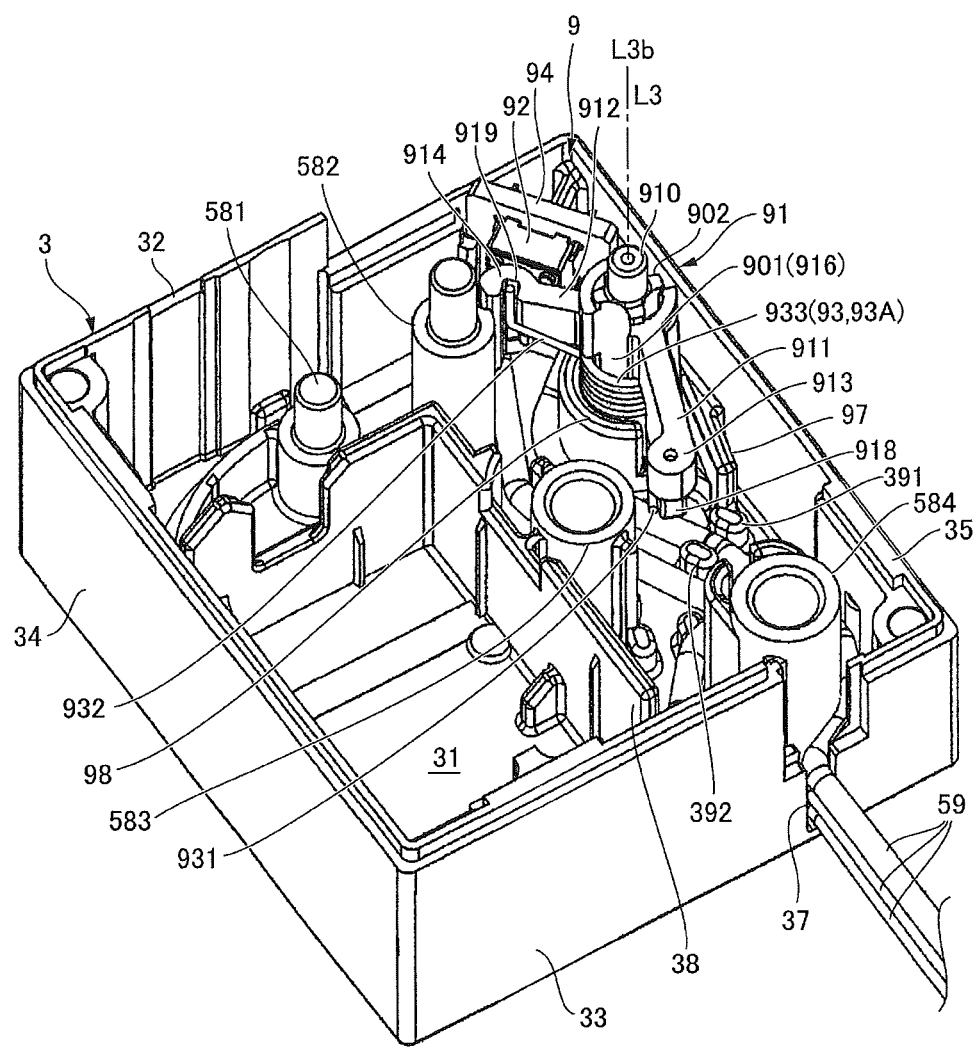
FIG. 13 is a perspective view showing a state that a turnable lever with which a torsion coil spring is engaged has been assembled into a cover.
Figure 14:
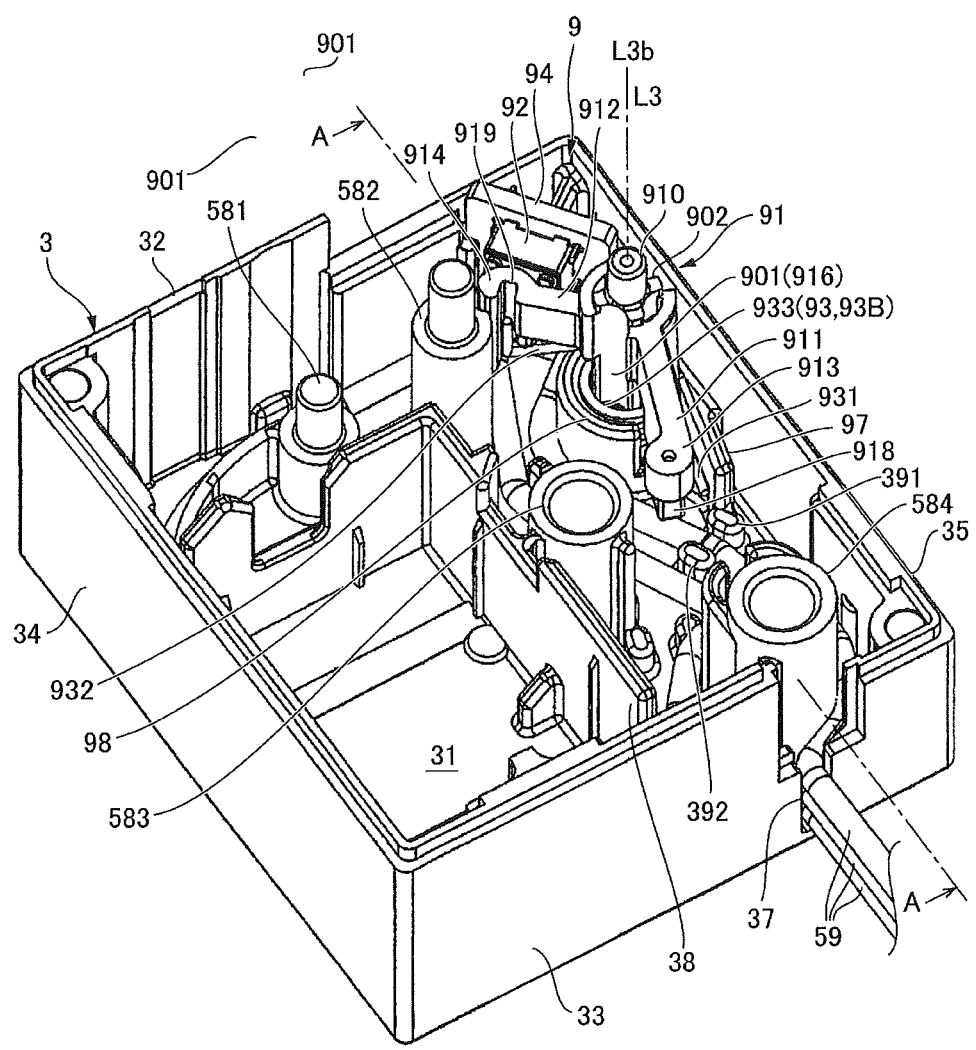
FIG. 14 is a perspective view showing a state that engaging of a torsion coil spring has been released.
Figure 15:
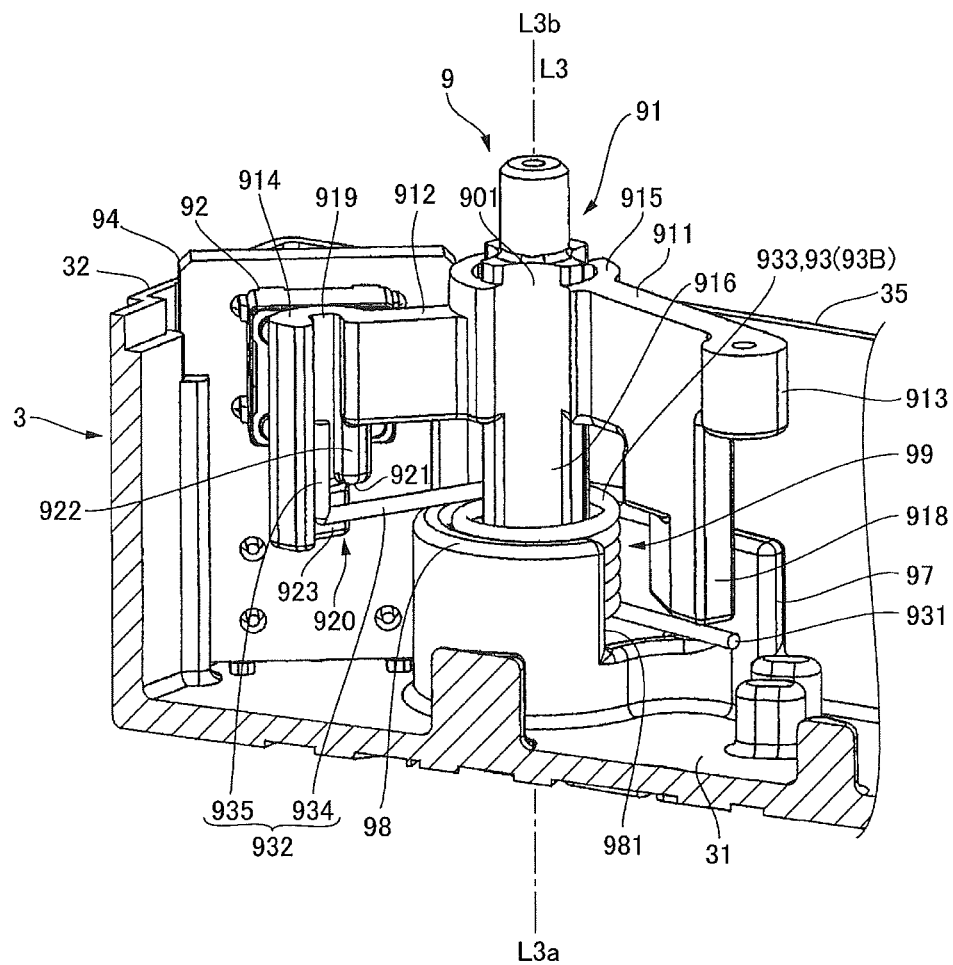
FIG. 15 is a cross sectional perspective view showing a state that engaging of a torsion coil spring has been released.

FIG. 11 is an exploded perspective view showing the turnable lever 91 and the torsion coil spring 93. Further, FIG. 12 is an exploded perspective view showing a state before the turnable lever 91 with which the torsion coil spring 93 is engaged is assembled into the cover 3. FIG. 13 is a perspective view showing a state that the turnable lever 91 with which the torsion coil spring 93 is engaged has been assembled into the cover 3. Further, FIG. 14 is a perspective view showing a state that engaging of the torsion coil spring 93 has been released. FIG. 15 is a cross sectional perspective view showing a state that engaging of the torsion coil spring 93 has been released (cross sectional perspective view at the "A-A" position in FIG. 14). In FIGS. 11 through 15, the third axial line "L3" is a turning center axial line of the turnable lever 91, and one side "L3a" in the third axial line "L3" is a side where the cover 3 is disposed and the other side "L3b" is an opposite side to the cover 3.

Figure 12:
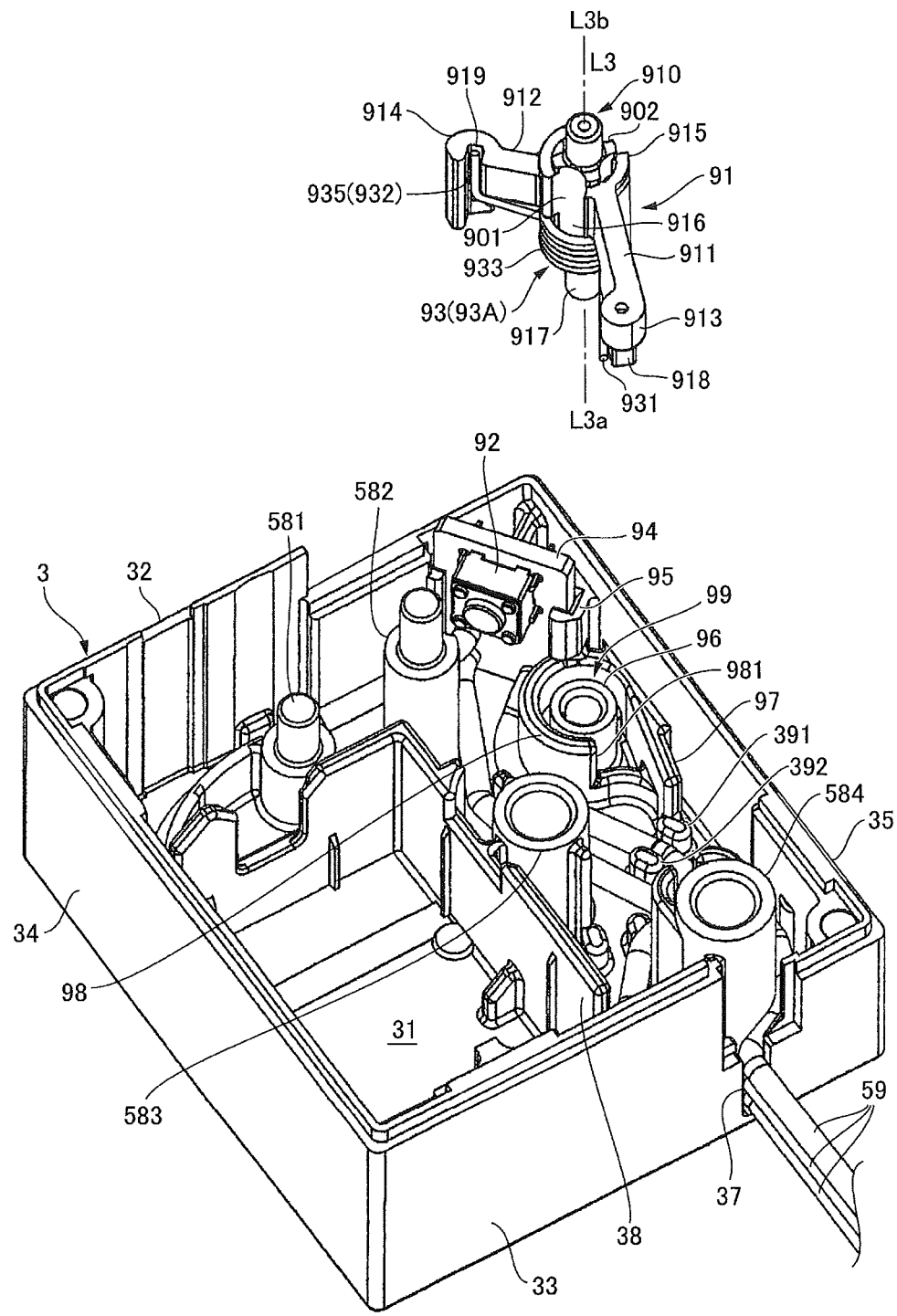
FIG. 12 is an exploded perspective view showing a state before a turnable lever with which a torsion coil spring is engaged is assembled into a cover.

As shown in FIG. 12, the cover 3 is formed with the circuit board holding part 95 which holds the switch circuit board 94, the lever holding part 96 which turnably supports the turnable lever 91, and the spring support wall 97 which supports one end part of the torsion coil spring 93. The lever holding part 96 is formed at a position adjacent to the circuit board holding part 95. Further, the spring support wall 97 is formed on an opposite side to the circuit board holding part 95 with respect to the lever holding part 96. The spring support wall 97 is arranged in an obtuse angle direction with respect to the switch circuit board 94 which is held by the circuit board holding part 95. Further, the spring support wall 97 is disposed at a position facing the third rotation support part 583 which rotatably supports the drive wheel 6 in which the sensor cam face 630 is formed.

The lever holding part 96 is a tube part formed in a cylindrical tube shape. The shaft part 910 of the turnable lever 91 is turnably supported by a shaft hole formed in the lever holding part 96. An outer side cylindrical tube part 98 which surrounds an outer peripheral side of the lever holding part 96 is formed on an outer peripheral side with respect to the lever holding part 96. The spring support wall 97 is connected with an edge of a cut-out part 981 which is formed in the outer side cylindrical tube part 98 in a circumferential direction and is extended in a straight line shape in a tangential direction of the outer side cylindrical tube part 98. A ring-shaped groove 99 which is a recessed part capable of accommodating the coil part 933 of the torsion coil spring 93 is formed between the lever holding part 96 and the outer side cylindrical tube part 98. As shown in FIG. 11, the torsion coil spring 93 is provided with the coil part 933 and straight line-shaped end parts 931 and 932 which are extended in directions different from each other from both ends in an axial line direction of the coil part 933. As shown in FIG. 14, in a state that assembling of the turnable lever 91 and the torsion coil spring 93 is completed, the coil part 933 is accommodated into the ring-shaped groove 99 (recessed part). Further, one end part 931 is passed through the cut-out part 981 and is supported by the spring support wall 97.

As shown in FIG. 14, in the state that assembling of the turnable lever 91 and the torsion coil spring 93 has been completed, the second arm part 912 is disposed at a position facing the switch 92. The first arm part 911 is protruded between the spring support wall 97 and the third rotation support part 583, and the first abutting part 913 provided at a tip end of first arm part 911 is abutted with the sensor cam face 630 (see FIG. 4) of the drive wheel 6 which is rotatably supported by the third rotation support part 583.

When the drive wheel 6 is turned, the small diameter part 631 and the large diameter part 632 of the sensor cam face 630 are sequentially abutted with the first abutting part 913 provided at the tip end of the first arm part 911 (see FIG. 4). In this manner, the first abutting part 913 is moved in directions approached to and separated from the spring support wall 97. As a result, the second arm part 912 of the turnable lever 91 is moved in directions approached to and separated from the switch 92 and the switch 92 is tuned on and off. In other words, when the large diameter part 632 of the sensor cam face 630 is abutted with the first arm part 911, the first arm part 911 is pressed and moved to a side of the spring support wall 97 and thus the turnable lever 91 is turned to the side of the spring support wall 97 against the urging force of the torsion coil spring 93. As a result, the tip end part (second abutting part 914) of the second arm part 912 is separated from the switch 92 and the switch 92 is turned off. On the other hand, when the small diameter part 631 of the sensor cam face 630 is abutted with the first arm part 911, the first arm part 911 is separated from the spring support wall 97 and the turnable lever 91 is turned in the urging direction (side of the switch 92) of the torsion coil spring 93. As a result, the tip end part (second abutting part 914) of the second arm part 912 is abutted with the switch 92 and the switch 92 is turned on.

As shown in FIG. 11, the shaft part 910 of the turnable lever 91 is provided with a large diameter part 915 with which the first arm part 911 and the second arm part 912 are connected, and a coil holding part 916 which is provided on the other side "L3b" of the large diameter part 915. A turnable shaft 917 whose diameter is smaller than the coil holding part 916 is formed on the other side "L3b" of the part holding part 916. When the turnable lever 91 is assembled into the cover 3, only the turnable shaft 917 of the shaft part 910 is inserted into the shaft hole of the lever holding part 96 and the coil holding part 916 is set in a state that the coil holding part 916 is protruded to the other side "L3b" from the lever holding part 96 (see FIGS. 13 and 14).

As shown in FIG. 11, an outer peripheral face of the shaft part 910 is formed with a groove-shaped cut-out part 901 which is extended in the third axial line "L3" direction. The cut-out part 901 is continuously formed on an outer peripheral face of the large diameter part 915, which is an arm connected part with which the first arm part 911 and the second arm part 912 are connected, and on an outer peripheral face of the coil holding part 916 in the third axial line "L3" direction. Further, the shaft part 910 is formed with a groove-shaped cut-out part 902 on an opposite side in a radial direction to the position where the cut-out part 901 is formed (see FIGS. 9 and 10 and the like). The cut-out part 902 is formed on the outer peripheral face of the large diameter part 915. The large diameter part 915 is formed with a flange 903 located on the one side "L3a" of the cut-out part 902.

The turnable lever 91 is formed with an engaging plate 918 which is protruded from the first arm part 911 to one side "L3a" in the third axial line "L3" direction. The engaging plate 918 is a first engagement part with which an end part 931 on one side of the torsion coil spring 93 is engaged. Further, a second abutting part 914 provided at a tip end of the second arm part 912 is formed in a shape which is protruded from the second arm part 912 to one side "L3a" in the third axial line "L3" direction. A holding groove 919 which is parallel to the third axial line "L3" is formed along an outer peripheral face of the second abutting part 914. The holding groove 919 is a second engagement part with which an end part 932 on the other side of the torsion coil spring 93 is engaged. The other end part 932 of the torsion coil spring 93 is provided with a first portion 934 extended in a radial direction from the coil part 933 and a second portion 935 which is formed by bending a tip end of the first portion 934 at a substantially right angle. The second portion 935 is engaged with the holding groove 919 (second engagement part).

In FIG. 11, an engaging position 93A of the torsion coil spring 93 is indicated by the two-dot chain line. The engaging position 93A is a position where the torsion coil spring 93 is engaged with the first arm part 911 and the second arm part 912. Both of the one end part 931 and the other end part 932 of the torsion coil spring 93 are engaged with the turnable lever 91 at the engaging position 93A, and the one end part 931 and the other end part 932 press the engaging plate 918 and the holding groove 919 in the circumferential direction by an elastic return force of the torsion coil spring 93. Therefore, the torsion coil spring 93 does not disengage from the turnable lever 91.

In this embodiment, the torsion coil spring 93 is set at the engaging position 93A and is assembled into the cover 3 together with the turnable lever 91. After that, the torsion coil spring 93 is made to slide to one side "L3a" in the third axial line "L3" direction and is depressed to the cover 3 side. As a result, the torsion coil spring 93 is moved to an engaging release position 93B which is an engaging release state that the end part 931 is disengaged from the first arm part 911 (see FIGS. 14 and 15). As a result, the end part 931 is abutted with the spring support wall 97, and the torsion coil spring 93 is arranged between the spring support wall 97 of the cover 3 and the second arm part 912 of the turnable lever 91.

As shown in FIG. 11, the second abutting part 914 for the torsion coil spring 93 is formed with a step part 920 which is formed by cutting out an edge on a side of the shaft part 910 (edge on the coil holding part 916 side) of the holding groove 919 in a stepped shape. The step part 920 is provided with a restriction part 921, which is a face facing one side "L3a" in the third axial line "L3" direction, and a first engagement region 922 and a second engaging region 923 which are disposed so as to form a step shape with the restriction part 921 as a boundary. The first engagement region 922 is projected to the shaft part 910 side and is provided on the other side "L3b" of the restriction part 921. On the other hand, the second engagement region 923 is provided on one side "L3a" of the restriction part 921.

The second engagement region 923 is provided at a position separated from the shaft part 910 with respect to the first engagement region 922. Further, the second engagement region 923 is located in a direction where the torsion coil spring 93 is developed and expanded with respect to the first engagement region 922 (in other words, a direction where the second portion 935 of the torsion coil spring 93 is pressed against the second abutting part 914 by the urging force).

At the engaging position 93A, the other end part 932 of the torsion coil spring 93 is located on the other side "L3b" with respect to the restriction part 921 and is abutted with the first engagement region 922. Further, the end part 931 is abutted with the engaging plate 918. Therefore, as shown in FIG. 13, even when the turnable lever 91 is attached to the lever holding part 96 in this state, the end part 931 of the torsion coil spring 93 is not contacted with the spring support wall 97 and thus the other end part 932 is not urged to the side of the switch 92.

As shown in FIG. 13, in the torsion coil spring 93 located at the engaging position 93A, an end part on the other side "L3b" of the coil part 933 is slightly entered to an inner side of the outer side cylindrical tube part 98 provided on an outer peripheral side of the lever holding part 96. However, most of the coil part 933 is exposed between the outer side cylindrical tube part 98 and the first arm part 911 and the second arm part 912. Therefore, the coil part 933 of the torsion coil spring 93 is depressed from the state to one side "L3a" and the coil part 933 is pushed into the ring-shaped groove 99. As a result, the end part 931 of the torsion coil spring 93 is disengaged from the engaging plate 918 and is set in the engaging release state shown in FIGS. 14 and 15. When the coil part 933 is to be pushed into the ring-shaped groove 99, the coil part 933 is slid along the outer peripheral face of the coil holding part 916 and the outer peripheral face of the lever holding part 96 in the third axial line "L3" direction. In this embodiment, an outer diameter dimension of the lever holding part 96 and an outer diameter dimension of the coil holding part 916 are the same as each other. Therefore, no step (difference) is existed between the outer peripheral face of the coil holding part 916 and the outer peripheral faces of the lever holding part 96 and thus the coil part 933 can be moved smoothly from the coil holding part 916 to the lever holding part 96.

In the turnable lever 91, the cut-out part 901 formed on the outer peripheral face of the shaft part 910 is opened in an end face on the other side "L3b" of the large diameter part 915. Therefore, after the turnable lever 91 with which the torsion coil spring 93 has been engaged is fitted to the lever holding part 96 to set in the state shown in FIG. 13, a jig for pressing is inserted into the cut-out part 901 from the other side "L3*b*" of the large diameter part 915 and the coil part 933 is pressed to one side "L3*a*" by the jig. As a result, the coil part 933 can be depressed to the engaging release position 93B (see FIGS. 14 and 15).

In this embodiment, the turnable lever 91 is assembled into a narrow space in the cover 3. Therefore, in a state that the turnable lever 91 has been assembled to the lever holding part 96, there is no sufficient workspace around the coil part 933 fitted to the turnable lever 91 and thus it is difficult to perform depressing work for the coil part 933 by hand. However, according to this embodiment, the cut-out part 901 is formed in the shaft part 910. Therefore, even in a case that the lever holding part 96 is provided in a narrow space, when a space is provided through which a jig for pressing is capable of inserting to the other side "L3*b*" of the cut-out part 901, the coil part 933 can be pressed down by inserting the jig into the cut-out part 901 through the space. Further, in this case, when a jig is inserted into the cut-out part 902 formed on the other side in the radial direction to the cut-out part 901 and thereby the flange 903 is pressed by the jig, inclinations of the torsion coil spring 93 and the turnable lever 91 with respect to the lever holding part 96 can be suppressed.

In the engaging release state, the end part 931 of the torsion coil spring 93 is disengaged from the engaging plate 918 and is abutted with the spring support wall 97. In this case, although the second portion 935 of the other end part 932 is slid to one side "L3*a*" along the holding groove 919, the second portion 935 does not disengage from the holding groove 919. Therefore, the end part 932 is maintained to be held by the second abutting part 914 of the turnable lever 91 and thus the second abutting part 914 is urged to the side of the switch 92 by the torsion coil spring 93.

As shown in FIG. 15, in the engaging release state, the first portion 934 of the other side end part 932 is depressed to a position on one side "L3*a*" with respect to the restriction part 921 of the step part 920. Therefore, the first portion 934 is disengaged from the first engagement region 922 of the step part 920 and is entered to one side "L3*a*" with respect to the restriction part 921 to be set in a state that the first portion 934 is abutted with the second engagement region 923 of the step part 920. In other words, when the engaging release operation is performed, the other side end part 932 is capable of being locked by the restriction part 921 and thus the torsion coil spring 93 is prevented from being moved to the other side "L3*b*".

(Principal Effects in this Embodiment)

As described above, the damper device 1 in this embodiment includes the geared motor 1A structured to drive the baffle 4, and the geared motor 1A includes the position sensor 9 structured to detect a rotation position of the baffle 4. The position sensor 9 is a switch mechanism structured to turn on and off the switch 92 by the turnable lever 91. The turnable lever 91 is turnably supported by the lever holding part 96 provided in the cover 3 (case) and is urged to the side of the switch 92 by the torsion coil spring 93 (urging member). In this embodiment, the torsion coil spring 93 is engaged between the first arm part 911 and the second arm part 912 of the turnable lever 91 and, in this state, the turnable lever 91 is attached to the cover 3. Next, after the turnable lever 91 is attached, the torsion coil spring 93 is moved to the engaging release position 93B and the torsion coil spring 93 is disposed between the cover 3 and the turnable lever 91 to urge the turnable lever 91. Therefore, when the position sensor 9 is to be assembled, the torsion coil spring 93 and the turnable lever 91 are not required to be held against the urging force. Further, the turnable lever 91 and the torsion coil spring 93 are prevented from contacting with components (for example, switch 92) disposed inside of the cover 3 by the urging force. Therefore, workability in assembling is satisfactory and the position sensor 9 can be easily assembled. Further, damage of the component in assembling is restrained.

In this embodiment, the second arm part 912 of the turnable lever 91 is provided with the holding groove 919 which is engaged with the end part 932 on the other side of the torsion coil spring 93. The holding groove 919 is provided with the first engagement region 922 in which the other side end part 932 is engaged when the torsion coil spring 93 is located at the engaging position 93A, and the second engagement region 923 in which the other side end part 932 is engaged when the torsion coil spring 93 is located at the engaging release position 93B. Therefore, the torsion coil spring 93 is capable of being disposed between the cover 3 and the turnable lever 91 by disengaging only the one end part 931 of the torsion coil spring 93 from the engaging plate 918. Further, the turnable lever 91 is provided with the restriction part 921 which restricts a return of the other side end part 932 from the second engagement region 923 to the first engagement region 922. Therefore, the torsion coil spring 93 is restricted from being returned to the engaging position 93A after assembling is performed.

In this embodiment, the shaft part 910 of the turnable lever 91 is provided with the coil holding part 916 which slidably holds the coil part 933 of the torsion coil spring 93 in the axial line direction and, in the engaging position 93A, the coil part 933 is held by the coil holding part 916. Further, the cover 3 is formed with the ring-shaped groove 99 which is a recessed part capable of accommodating the coil part 933 of the torsion coil spring 93 having been moved to the engaging release position 93B. The ring-shaped groove 99 is formed between the lever holding part 96 and the outer side cylindrical tube part 98 provided on its outer peripheral side, and the outer side cylindrical tube part 98 is formed with the cut-out part 981 and the spring support wall 97 is formed on the outer peripheral side of the cut-out part 981. Therefore, after the turnable lever 91 has been attached to the cover 3, when the coil part 933 is depressed to one side "L3*a*" and is moved from the engaging position 93A to the engaging release position 93B, the coil part 933 is pushed into the ring-shaped groove 99 and the one side end part 931 is passed through the cut-out part 981 and the one side end part 931 is supported by the spring support wall 97. Accordingly, the torsion coil spring 93 is disposed between the cover 3 and the turnable lever 91 by a simple operation.

In the turnable lever 91 in this embodiment, a jig can be inserted into the cut-out part 901 which is formed in the large diameter part 915 and the outer peripheral face of the coil holding part 916 and, when the coil part 933 is pressed down by the jig, the torsion coil spring 93 can be depressed to the engaging release position 93B. Therefore, even when the lever holding part 96 is provided in a narrow space, the torsion coil spring 93 can be easily depressed to the engaging release position 93B.

In this embodiment, the lead wire 59 which connects the motor 50 with the switch 92 is disposed and extended along the bottom part 31 of the cover 3, and the motor 50 is disposed so as to cover an upper side with respect to the lead wire 59. As described above, when the lead wire 59 is passed through between the bottom part 31 of the cover 3 and the motor 50, floating of the lead wire 59 can be prevented by the motor 50. Further, the lead wire 59 is not passed over the motor 50 and thus, when the cover 3 is covered with the frame 2 so that the cover 3 and the frame 2 are fixed to each other, the lead wire 59 is prevented from being caught between the cover 3 and the frame 2. Further, the lead wire 59 can be disposed by utilizing a space between the bottom part 31 of the cover 3 and the motor 50 and space-saving can be attained.

The cover 3 in this embodiment is formed with the wire holding protruded part 394 for holding the lead wire 59 passed between the bottom part 31 of the cover 3 and the motor 50 in the vicinity of the motor rear end face 502 where the motor terminals 501 are formed. Therefore, contacting of an edge of the motor rear end face 502 with the lead wire 59 is restrained and disconnection of the lead wire 59 is restrained. Further, the wire holding protruded parts 391, 392 and 393 for holding the lead wire 59 disposed and extended along the bottom part 31 of the cover 3 are formed between the position sensor 9 and the motor 50 as a protruded part for holding a lead wire. Therefore, the lead wire 59 can be held so as not to float upward and thus disconnection of the lead wire 59 is restrained. Especially, a portion of the lead wire 59 passing between a turnable range of the turnable lever 91 and the bottom part 31 of the case 3 can be held by the wire holding protruded parts 391, 392 and 393 so that floating is restrained and thus the lead wire 59 can be held so as not to contact with the turnable lever 91.

In the embodiment described above, a torsion coil spring is used as an urging member for urging the turnable lever 91. However, other urging members may be used. For example, a flat spring may be used.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A switch mechanism comprising:
   a lever holding part which is provided in a case;
   a turnable lever comprising a shaft part which is turnably supported by the lever holding part and a first arm part and a second arm part which are protruded from the shaft part;
   an urging member structured to urge the turnable lever; and
   a switch whose state is switched by displacement of the turnable lever;
   wherein the turnable lever is attached to the lever holding part in a state that the urging member is capable of being engaged between the first arm part and the second arm part;
   wherein the urging member is structured to move between an engaging position, where the urging member is engaged between the first arm part and the second arm part, and an engaging release position, where the urging member is engaged with the second arm part and is disengaged from the first arm part,
   wherein the first arm part comprises a first engagement part with which a first end part of the urging member is engaged,
   wherein the second arm part comprises a second engagement part with which a second end part of the urging member is engaged,
   wherein the second end part of the urging member when located at the engaging position is engaged at a first engagement region,
   wherein the second end part of the urging member when located at the engaging release position is engaged at a second engagement region,
   wherein the urging member is a torsion coil spring comprising a coil part through which the shaft part is passed, and
   wherein the first end part and the second end part of the torsion coil spring are protruded to different direction from the coil part.

2. The switch mechanism according to claim 1, wherein the second engagement part comprises a restriction part structured to restrict a return of the second end part from the second engagement region to the first engagement region.

3. The switch mechanism according to claim 1, wherein the shaft part comprises a coil holding part, and the coil part slides to one side in the axial line direction when the torsion coil spring is moved to the engaging release position from the engaging position.

4. The switch mechanism according to claim 3, wherein the shaft part comprises an arm connected part with which the first arm part and the second arm part are connected, the coil holding part is formed on the one side in the axial line direction of the arm connected part, and outer peripheral faces of the arm connected part and the coil holding part are formed with cut-outs extended in the axial line direction.

5. The switch mechanism according to claim 3, wherein the case comprises a recessed part structured to accommodate the coil part of the torsion coil spring moved to the engaging release position.

6. The switch mechanism according to claim 5, wherein the recessed part is provided between the lever holding part and a cylindrical tube part provided on an outer peripheral side with respect to the lever holding part, and the first end part is passed through a cut-out formed in the cylindrical tube part and is supported by a spring support wall formed on an outer peripheral side of the cylindrical tube part.

7. The switch mechanism according to claim 1, wherein the switch is a pressing type switch.

8. A geared motor comprising:
   the switch mechanism defined in claim 1;
   a rotation transmission mechanism comprising a cam gear on which a cam face capable of abutting with the first arm part is formed; and
   a motor structured to drive the rotation transmission mechanism.

9. The geared motor according to claim 8, wherein the rotation transmission mechanism comprises a driven wheel which is formed with an output shaft and a drive wheel structured to turn the driven wheel, and the drive wheel includes the cam gear.

10. The geared motor according to claim 8, wherein the rotation transmission mechanism and the motor are accommodated in the case.

11. The geared motor according to claim 8, wherein the case is formed with a protruded part.

12. The geared motor according to claim 11, wherein a portion of a lead wire which is connected with the switch and is passed between a turnable range of the turnable lever and the case is held by the protruded part.

13. The geared motor according to claim 8, wherein a lead wire structured to connect the motor with the switch is passed through a space between a bottom part of the case and the motor.

14. The geared motor according to claim 8, wherein
the first arm part comprises a first engagement part with which a first end part of the urging member is engaged,
the second arm part comprises a second engagement part with which the second end part of the urging member is engaged,
the second end part of the urging member located at the engaging position is engaged at a first engagement region; and
the second end part of the urging member located at the engaging release position is engaged at a second engagement region.

15. A geared motor comprising:
a switch mechanism comprising:
   a lever holding part which is provided in a case;
   a turnable lever comprising a shaft part which is turnably supported by the lever holding part and a first arm part and a second arm part which are protruded from the shaft part;
   an urging member structured to urge the turnable lever; and
   a switch whose state is switched by displacement of the turnable lever; wherein the turnable lever is attached to the lever holding part in a state that the urging member is capable of being engaged between the first arm part and the second arm part; and wherein the urging member is structured to move between an engaging position, where the urging member is engaged between the first arm part and the second arm part, and an engaging release position, where the urging member is engaged with the second arm part and is disengaged from the first arm part;
a rotation transmission mechanism comprising a cam gear on which a cam face capable of abutting with the first arm part is formed; and
a motor structured to drive the rotation transmission mechanism,
wherein the first arm part comprises a first engagement part with which a first end part of the urging member is engaged,
wherein the second arm part comprises a second engagement part with which the second end part of the urging member is engaged,
wherein the second end part of the urging member when located at the engaging position is engaged at a first engagement region,
wherein the second end part of the urging member when located at the engaging release position is engaged at a second engagement region,
wherein the second engagement part comprises a restriction part structured to restrict a return of the second end part from the second engagement region to the first engagement region.

16. The geared motor according to claim 14, wherein
the urging member is a torsion coil spring comprising a coil part through which the shaft part is passed,
the first end part and the second end part of the torsion coil spring are protruded to different directions from the coil part,
the shaft part comprises a coil holding part, and
the coil part slides to one side in the axial line direction when the torsion coil spring is moved to the engaging release position from the engaging position.

17. The geared motor according to claim 16, wherein
the shaft part comprises an arm connected part with which the first arm part and the second arm part are connected,
the coil holding part is formed on the one side in the axial line direction of the arm connected part, and
outer peripheral faces of the arm connected part and the coil holding part are formed with cut-out extended in the axial line direction.

18. The geared motor according to claim 16, wherein
the case comprises a recessed part structured to accommodate the coil part of the torsion coil spring moved to the engaging release position,
the recessed part is provided between the lever holding part and a cylindrical tube part provided on an outer peripheral side with respect to the lever holding part, and
the first end part is passed through a cut-out formed in the cylindrical tube part and is supported by a spring support wall formed on an outer peripheral side of the cylindrical tube part.

19. A damper device comprising:
the geared motor defined in claim 8;
a baffle which is turned by the geared motor; and
a frame provided with an opening which is opened and closed by the baffle;
wherein the frame is fixed to the case.

20. The damper device according to claim 19, further comprising a wiring outlet which is formed between the case and the frame.

21. A damper device comprising:
a geared motor comprising:
   a switch mechanism comprising:
      a lever holding part which is provided in a case;
      a turnable lever comprising a shaft part which is turnably supported by the lever holding part and a first arm part and a second arm part which are protruded from the shaft part;
      an urging member structured to urge the turnable lever; and
      a switch whose state is switched by displacement of the turnable lever; wherein the turnable lever is attached to the lever holding part in a state that the urging member is capable of being engaged between the first arm part and the second arm part; wherein the urging member is structured to move between an engaging position, where the urging member is engaged between the first arm part and the second arm part, and an engaging release position, where the urging member is engaged with the second arm part and is disengaged from the first arm part;
   a rotation transmission mechanism comprising a cam gear on which a cam face capable of abutting with the first arm part is formed; and
   a motor structured to drive the rotation transmission mechanism;
a baffle which is turned by the geared motor; and
a frame provided with an opening which is opened and closed by the baffle;

wherein the frame is fixed to the case,
wherein
the rotation transmission mechanism comprises a driven wheel which is formed with an output shaft and a drive wheel structured to turn the driven wheel, and
the drive wheel includes the cam gear.

22. The damper device according to claim 19, wherein the rotation transmission mechanism and the motor are accommodated in the case, and
the case is formed with a protruded part.

23. The damper device according to claim 19, wherein a lead wire structured to connect the motor with the switch is passed through a space between a bottom part of the case and the motor.

24. The damper device according to claim 19, wherein
the first arm part comprises a first engagement part with which a first end part of the urging member is engaged,
the second arm part comprises a second engagement part with which the second end part of the urging member is engaged,
the second end part of the urging member when located at the engaging position is engaged at a first engagement region; and
the second end part of the urging member when located at the engaging release position is engaged at a second engagement region.

25. The damper device according to claim 24, wherein the second engagement part comprises a restriction part structured to restrict a return of the second end part from the second engagement region to the first engagement region.

26. The damper device according to claim 24, wherein
the urging member is a torsion coil spring comprising a coil part through which the shaft part is passed,
the first end part and the second end part of the torsion coil spring are protruded to different directions from the coil part,
the shaft part comprises a coil holding part, and
the coil part slides to one side in the axial line direction when the torsion coil spring is moved to the engaging release position from the engaging position.

27. The damper device according to claim 26, wherein
the shaft part comprises an arm connected part with which the first arm part and the second arm part are connected,
the coil holding part is formed on the one side in the axial line direction of the arm connected part, and
outer peripheral faces of the arm connected part and the coil holding part are formed with cut-out extended in the axial line direction.

28. The damper device according to claim 26, wherein
the case comprises a recessed part which accommodates the coil part of the torsion coil spring moved to the engaging release position,
the recessed part is provided between the lever holding part and a cylindrical tube part provided on an outer peripheral side with respect to the lever holding part, and
the first end part is passed through a cut-out formed in the cylindrical tube part and is supported by a spring support wall formed on an outer peripheral side of the cylindrical tube part.

\* \* \* \* \*